US012614057B2

(12) United States Patent (10) Patent No.: US 12,614,057 B2

Lillo (45) Date of Patent: Apr. 28, 2026

(54) TRAINING-SUPPORT-BASED MACHINE LEARNING CLASSIFICATION AND REGRESSION AUGMENTATION

(71) Applicant: The Aerospace Corporation, El Segundo, CA (US)

(72) Inventor: Walter Engevald Lillo, Westlake Village, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 1197 days.

(21) Appl. No.: 17/249,604

(22) Filed: Mar. 5, 2021

(65) Prior Publication Data

US 2022/0284261 A1 Sep. 8, 2022

(51) Int. Cl.
  G06N 3/04 (2023.01)
  G06N 3/08 (2023.01)

(52) U.S. Cl.
  CPC ................ G06N 3/04 (2013.01); G06N 3/08 (2013.01)

(58) Field of Classification Search
  CPC ............ G06N 3/04; G06N 3/08; G06N 3/044; G06N 3/0464; G06N 3/084; G06N 20/10; G06N 7/01; G06N 3/09
  See application file for complete search history.

(56) References Cited

U.S. PATENT DOCUMENTS 9,779,081 B2 10/2017 Simard et al.
10,951,306 B1 * 3/2021 Thommana ............ G06N 20/00

10,970,629 B1 * 4/2021 Dirac ........................ G06N 7/01
10,997,500 B1 * 5/2021 Vishnu Narayanan ......................
                                G06N 3/0499
2002/0040367 A1 4/2002 Choi et al.
2014/0229158 A1 * 8/2014 Zweig ...................... G06N 3/04
                                704/9
2015/0254555 A1 * 9/2015 Williams, Jr. ......... G06N 3/045
                                706/14
2017/0156582 A1 * 6/2017 Ehlers .................... G16H 50/30
2019/0164278 A1 5/2019 Abramoff et al.

(Continued)

OTHER PUBLICATIONS

Estimating False Negatives for Classification Problems with Cluster Structure György J. Simon, Vipin Kumar, and Zhi-Li Zhang Proceedings of the 2007 SIAM International Conference on Data Mining (SDM). 2007, 599-604 (Year: 2007).*

(Continued)

*Primary Examiner* — Abdullah Al Kawsar
*Assistant Examiner* — Gisel Gabriela Faccenda
(74) *Attorney, Agent, or Firm* — Knobbe, Martens, Olson & Bear, LLP

(57) ABSTRACT

Machine learning models are provided that consider, during the process of producing output, various aspects of the training data and/or training process from which the models are created. A machine learning model may generate output (e.g., classification determinations or regression output) that is augmented with information regarding the distribution(s) of the corpus of training data upon which the model was trained, the features extracted from the training data, the resulting determinations made by the model, and/or other information. The augmentation may occur internally while generating the model output, or the output itself may be augmented to include distribution-based data in addition to a model output.

22 Claims, 12 Drawing Sheets

(56) References Cited

U.S. PATENT DOCUMENTS

2019/0392248 A1* 12/2019 Zhang .................. G06V 10/761
2022/0019807 A1* 1/2022 Carreira ................ G06V 20/46

OTHER PUBLICATIONS

Cord, M., Cunningham, P. (eds) Machine Learning Techniques for Multimedia. Cognitive Technologies. Springer, Berlin, Heidelberg . https://doi.org/10.1007/978-3-540-75171-7_2 (Year: 2008).*
Danka, Tivadar, "Does a neural network know when it doesn't know?"—available at https://towardsdatascience.com/does-a-neural-network-know-what-it-doesnt-know-c2b4517896d7. Aug. 29, 2019.
Papernot, Nicolas, et al., "Deep k-Nearest Neighbors: Towards Confident, Interpretable and Robust Deep Learning"—available at https://arxiv.org/pdf/1803.04765.pdf.
Papernot, Nicolas, et al., "How to know when machine learning does not know"—available at http://www.cleverhans.io/security/2019/05/20/dknn.html. May 20, 2019.

* cited by examiner

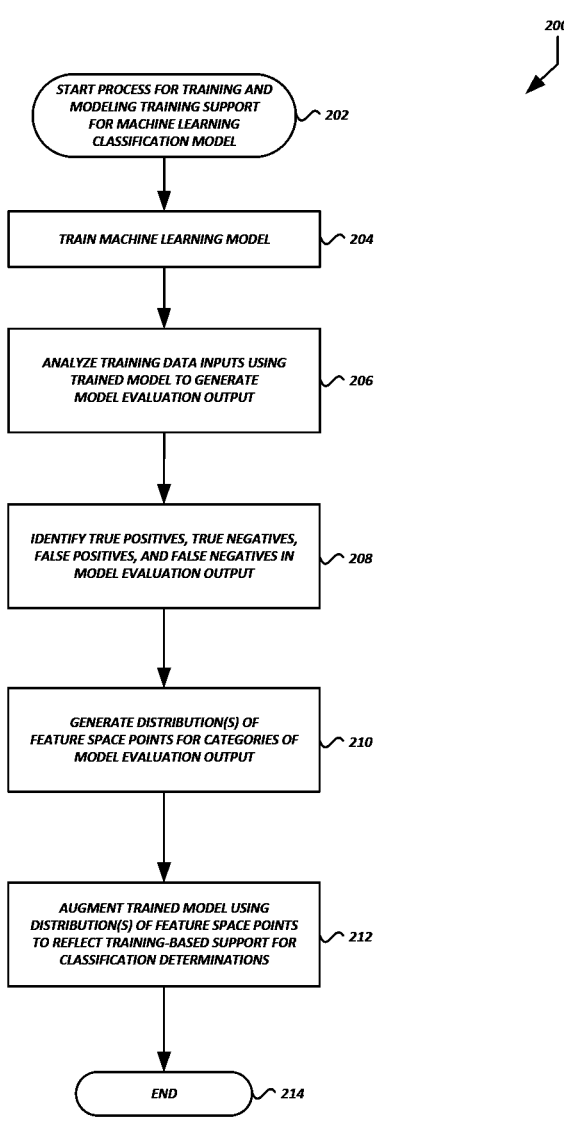

*200*

START PROCESS FOR TRAINING AND
MODELING TRAINING SUPPORT
FOR MACHINE LEARNING
CLASSIFICATION MODEL — *202*

TRAIN MACHINE LEARNING MODEL — *204*

ANALYZE TRAINING DATA INPUTS USING
TRAINED MODEL TO GENERATE
MODEL EVALUATION OUTPUT — *206*

IDENTIFY TRUE POSITIVES, TRUE NEGATIVES,
FALSE POSITIVES, AND FALSE NEGATIVES IN
MODEL EVALUATION OUTPUT — *208*

GENERATE DISTRIBUTION(S) OF
FEATURE SPACE POINTS FOR CATEGORIES OF
MODEL EVALUATION OUTPUT — *210*

AUGMENT TRAINED MODEL USING
DISTRIBUTION(S) OF FEATURE SPACE POINTS
TO REFLECT TRAINING-BASED SUPPORT FOR
CLASSIFICATION DETERMINATIONS — *212*

END — *214*

START AUGMENTED
CLASSIFICATION PROCESS — *702*

OBTAIN INPUT DATA — *704*

GENERATE FEATURE DATA — *706*

GENERATE INITIAL CLASSIFICATION DATA — *708*

GENERATE AUGMENTED CLASSIFICATION
OUTPUT BASED ON FEATURE DATA
AND TRAINING-BASED SUPPORT FOR
A CLASSIFICATION DETERMINATION BASED
ON THE CURRENT FEATURE DATA
(AND OPTIONALLY, INITIAL CLASSIFICATION DATA) — *710*

END — *712*

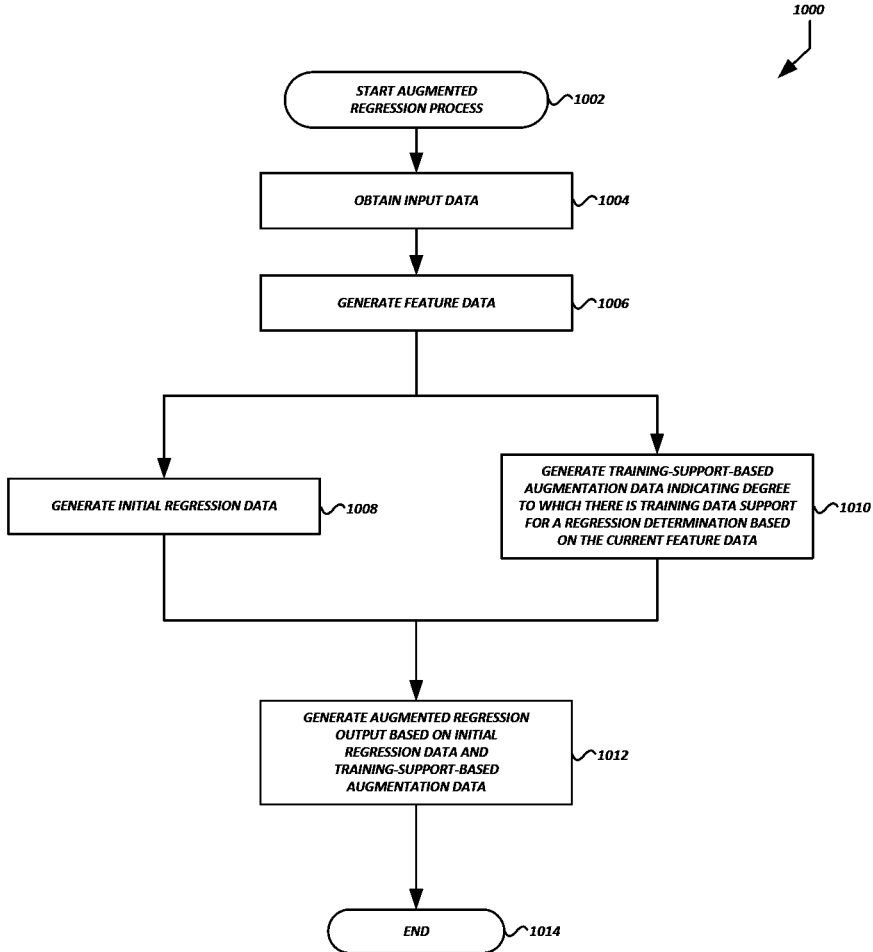

*1000*

START AUGMENTED REGRESSION PROCESS — *1002*

OBTAIN INPUT DATA — *1004*

GENERATE FEATURE DATA — *1006*

GENERATE INITIAL REGRESSION DATA — *1008*

GENERATE TRAINING-SUPPORT-BASED AUGMENTATION DATA INDICATING DEGREE TO WHICH THERE IS TRAINING DATA SUPPORT FOR A REGRESSION DETERMINATION BASED ON THE CURRENT FEATURE DATA — *1010*

GENERATE AUGMENTED REGRESSION OUTPUT BASED ON INITIAL REGRESSION DATA AND TRAINING-SUPPORT-BASED AUGMENTATION DATA — *1012*

END — *1014*

Fig. 10

TRAINING-SUPPORT-BASED MACHINE LEARNING CLASSIFICATION AND REGRESSION AUGMENTATION

BACKGROUND

Models representing data relationships and patterns, such as functions, algorithms, systems, and the like, may accept input (sometimes referred to as an input vector), and produce output (sometimes referred to as an output vector) that corresponds to the input in some way. For example, a machine learning model may be implemented as an artificial neural network. Artificial neural networks are artificial in the sense that they are computational entities, analogous to biological neural networks, but implemented by computing devices. Output of neural-network-based models, typically in the form of a score, is obtained by doing a "forward pass." The forward pass involves multiplying large neural network weight matrices, representing the parameters of the model, by vectors corresponding to input vectors or hidden intermediate representations, as well as performing other mathematical operations. The parameters of a neural network can be set in a process referred to as training.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 2 is a flow diagram of an illustrative process for training-support-based augmentation of an artificial neural network according to some embodiments.

FIG. 10 is a flow diagram of an illustrative process for generating regression output using an artificial neural network with a training support augmentation component according to some embodiments.

DETAILED DESCRIPTION OF ILLUSTRATIVE EMBODIMENTS

Figure 1:
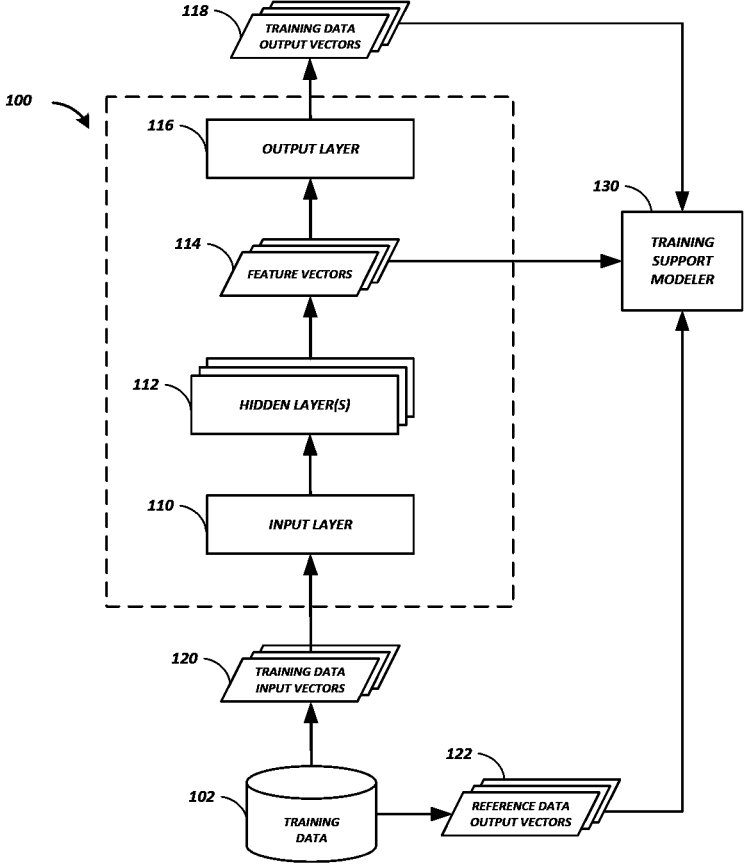
FIG. 1 is a diagram of an illustrative artificial neural network architecture with training-support-based augmentation according to some embodiments.

The present disclosure is directed to generating and using machine learning models configured to consider, during the process of producing output, various aspects of the training data and/or training process from which the models are created. A machine learning model may generate output (e.g., classification output or regression output) that is augmented with information regarding the training support for the output, such as the distribution(s) of the corpus of training data upon which the model was trained, the features extracted from the training data, the resulting classification or regression determinations made by the model, and/or other information.

The distributions may be or include distributions of training data features from which the trained model produces classifications. For example, if a classification model is trained to discriminate between two mutually-exclusive classifications, the distributions may be of training data features from which the trained model produces true positive classifications (e.g., training data features that are correctly classified in a particular classification), false positive classifications (e.g., training data features that are incorrectly determined to be in a particular classification), true negative classifications (e.g., training data features that are correctly determined to not be in a particular classification), and/or false negative classifications (e.g., training data features that are incorrectly determined to not be in a particular classification). If the trained model is configured to make additional classification determinations (e.g., three or more classifications) and/or the classifications are not mutually exclusive, then additional distributions may be generated. The distributions may also or alternatively include a distribution of all training points (e.g., to identify regions where there is insufficient support for regression determinations). As another example, if a regression model is trained to generate a output values over a continuous domain based on a range of inputs, the distributions may be of training data features from which the trained model produces output with small errors (e.g., the regression output is within a range of the desired output, or has an error that is less than a large error threshold), large positive errors (e.g., the regression output is more than a large error threshold amount greater than the desired output), and/or large negative errors (e.g., the regression output is more than a large error threshold amount less than the desired output). The distributions may also or alternatively include a distribution of all training points (e.g., to identify regions where there is insufficient support for regression determinations).

The training-support-based augmentation may occur within the model while generating the classification or regression output (e.g., the classification output is adjusted based on the distributions), or the model output itself may be augmented to include training-support-based data in addition to a classification or regression output (e.g., a classification model output may include both a classification determination such as a score, and also a training-support-based metric or other score; a regression model output may include both a regression value, and also a training-support-based metric or other score). Thus, systems that consume output of the machine learning model receive output that is indicative of not just the classification or regression determination itself, but also the degree of certainty or uncertainty in the training process that serves as the foundation from which the model makes such classification or regression determinations.

Examples of machine learning models that may be used with aspects of this disclosure include artificial neural networks (including deep neural networks, recurrent neural networks, convolutional neural networks, and the like), linear regression models, logistic regression models, decision trees, random forests, support vector machines, Naïve or a non-Naïve Bayes network, k-nearest neighbors models, k-means models, clustering models, or any combination thereof.

Some conventional machine learning models are configured and trained to produce classification scores that reflect the likelihood or "confidence" that a particular input is properly classified or not classified in a particular classification. For example, input may be analyzed using a machine learning model, and the output of the analysis for a particular classification may be a classification score in the range [0.0, 1.0]. A higher score indicates a higher probability or confidence that the input is properly classified in the particular classification, and a lower score indicates a lower probability or confidence that the input is properly classified in the particular classification. However, although the output may be generated by a trained and tested model, the model may not have been trained and tested using data that is similar to the particular data currently being analyzed by the model. In some cases, a model may have been trained using an adequate or significant amount of training data that is similar to the particular data currently being analyzed by the model, but the trained model may generate output that is associated with a high number of false positives and/or false negatives for such data. When relevant training data is lacking or the results produced by the trained model on relevant training data are not adequately reliable, the trained model nevertheless still produces classification output. The output may be indicative of a relatively high confidence in a classification determination (e.g., the confidence score may be close to 0.0 or 1.0) and may be provided without any indication that the training basis is inadequate, or the model is unreliable in that region of the feature space. Thus, a consumer of such model output may not have any way of discriminating between high confidence scores in cases where there is a substantial training basis and an effective model, and high confidence scores in cases where there is a lack of adequate training basis or an ineffective model. Similar issues arise with conventional machine learning models configured and trained to produce regression output. Although the regression models may be associated with confidence metrics that are determined over the entire domain of inputs, a consumer of output from such a model may not have any way of determining the confidence with which any particular output was generated from any particular input.

Some aspects of the present disclosure relate to analyzing data associated with training of models to assist in determining the support for future classification determinations made using the trained models. In some embodiments, the analysis may include determining one or more distributions of data upon which a machine learning model has been trained. The distributions may be distributions of features generated from the corpus of training data input upon which the machine learning model has been trained. After a machine learning model has been trained, the training data may be analyzed (e.g., using at least a portion of the trained model, such as the hidden layers of a neural network) to generate features from which a final classification determination is made. The classification output of the model, representing a positive or negative determination of membership in a class, may then be compared with a reference output, representing the correct or otherwise excepted output, to determine whether the output of the model is a true positive, false positive, true negative, or false negative classification determination. The feature data from which the classification determination is made may then be tagged or otherwise associated with the output accuracy determination. Distributions of individual classification determinations in various output accuracy sets, based on whether the classification determinations are positive or negative for membership in a class and whether the classification determinations are true or false classification determinations, may then be generated. For example, separate distributions (e.g., mixture densities such as those represented by Gaussian mixture models) may be determined for the groups of feature data associated with true positive, false positive, true negative, and false negative outputs. A distribution of all features from which classification determinations were made during training, also referred to as a training feature set, may also or alternatively be generated. In some embodiments, instead of—or in addition to—determining such distributions, a training support classification component may be generated and trained. For example, a separate training support classification model may be trained using the feature data from the training of the target model and the false negative, true negative, false positive, and true positive determinations. The training support classification model may be configured and trained to determine when feature data generated from a given input is anomalous in some respect. The anomalous nature may be due to the feature data being associated with a relatively large number of false positives or false negatives, due to the feature data being associated with a relatively small quantity of similar training data inputs, or some other indicia of anomaly in the data.

Additional aspects of the present disclosure relate to augmenting machine learning model output based on the support for the classification determinations made by the model. In some embodiments, classification output such as a confidence score may be augmented to include additional output data, such as a training support metric. For example, the initial classification score may be determined for a particular input (e.g., a value in the range [0.0, 1.0]). In addition, a separate training support classification model may determine, for the features extracted from the particular input (e.g., the values determined by the last internal layer of a neural network), a training support metric indicating the degree to which the features are "anomalous" (e.g., not similar to an adequate density of features observed during training, similar to features associated with a significant number of false positives, false negatives, etc.). Both the classification score and the training support metric may be output for use by systems that consume output of the model. In this way, consumer systems can adjust, discard, or otherwise deal with output as desired.

In some embodiments, machine learning model classification output may be scaled, weighted, or otherwise adjusted based on a training support metric, rather than being output separately from the training support metric. For example, the training support metric may be used as a weighting factor that is applied to a classification score. The weighting factor may have the effect of moving the classification score away from the extremes of its range (e.g., away from values indicating a high confidence that input is either within or not within a particular classification) when training support for the determination is not adequate. In some embodiments, rather than using a training support metric as a weight to adjust a classification score or outputting the metric as an additional data item, the machine learning model may use training distribution data in combination with input feature data when generating a classification score. For example, the classification output portion of the model may be a Bayesian classifier that considers both the feature data for the input and also training support distribution data to generate a classification score.

Some aspects of the present disclosure relate to determining training-based support for regression models, and using the training-based support to augment output of the regression models. In some embodiments, an analysis may be performed to determine one or more distributions of data upon which a machine learning regression model has been trained. After a regression model has been trained, the training data may be analyzed (e.g., using at least a portion of the trained model, such as the hidden layers of a neural network) to generate features from which a final regression determination is made. The regression output of the model, representing a value in a domain of values, may then be compared with a reference output, representing the correct or otherwise excepted output, to identify any error in the output of the model. The errors may be grouped based on accuracy (e.g., based on whether each error is a small error, large positive error, or large negative error). The feature data from which each regression determination is made may then be tagged or otherwise associated with the output accuracy determination. Distributions of individual regression determinations in various output accuracy sets, based on whether the regression determinations have small error (or no error), large positive error, or large negative error, may then be generated. For example, separate distributions (e.g., mixture densities such as those represented by Gaussian mixture models) may be determined for the groups of feature data associated with small error, large positive error, and large negative error outputs. A distribution of all features from which regression determinations were made during training, also referred to as a training feature set, may also or alternatively be generated. In some embodiments, instead of—or in addition to—determining such distributions, a training support classification component may be generated and trained. For example, a separate training support classification model may be trained using the feature data from the training of the target model and the small error, large positive error, and large negative error determinations. The training support classification model may be configured and trained to determine when feature data generated from a given input is classified as a small error, large positive error, large negative error, insufficient training data support, or otherwise anomalous in some respect. The model (or a component that will manage use of the model) may be configured to augment regression output with additional output data, such as a training support metric based on one or more of the training data distributions or the training support classification model. For example, a regression score may be determined for a particular input. In addition, a separate training support classification model may determine, for the features extracted from the particular input (e.g., the values determined by the last internal layer of a neural network), a training support metric indicating the degree to which the features are "anomalous" (e.g., not similar to an adequate density of features observed during training, similar to features associated with a large positive error, large negative error, etc.). Both the regression score and the training support metric may be output for use by systems that consume output of the model. In this way, consumer systems can adjust, discard, or otherwise deal with output as desired.

Further aspects of the present disclosure relate to using different training support distribution data or other training support metrics depending upon certain characteristics of the input data. In some embodiments, input data may be associated with metadata describing different characteristics of the input, such as source identity, geographic associations, demographic data, timestamps, and the like. When a system analyzes input data with a machine learning model, the system may use different values or sets of training support distribution data or other training support metrics depending upon the specific characteristics of the input data. In this way, a given machine learning model can be used to analyze various input, and the training-related aspects of classification can be customized based on the characteristics of the input to account for differences in the training basis for the different characteristics. Different conditions result in different distributions of false positives and false negatives because the classification values vary with metadata inputs. For example, in country A something may be considered desirable, while in country B the same thing may be considered undesirable.

Still further aspects of the present disclosure relate to applications of training-support-based machine learning classifier augmentation. Training-support-based augmented machine learning models may provide more reliable analysis and classification or regression analysis of a variety of different data, including but not limited to medical data (e.g., scan or imaging data, diagnostic data, electronic health record data, etc.), imaging data (e.g., videos, images, or sensor output, such as from a surveillance device, robotic device, autonomous vehicle, etc.), security data (e.g., individual risk factors, surveillance video, etc.), consumer data (e.g., event history, financial data, etc.), or other data. For example, a medical diagnosis that is based on machine learning classification of medical data may be handled differently depending upon the training-based support for the classification. Whereas a classification of medical data indicating the presence or absence of a disease may have been made with high confidence using conventional machine learning models, a machine learning model with training-supported-based augmentation may indicate that there is little training-based support for the determination, and therefore it may not be reliable. As another example, decisions regarding navigation, supply chain optimization, consumer credit, or security risks may be handled differently depending upon the training-based support for the classification or regression.

Various aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrative only, and are not intended to be limiting. In addition, any feature, process, device, or component of any embodiment described and/or illustrated in this specification can be used by itself, or with or instead of any other feature, process, device, or component of any other embodiment described and/or illustrated in this specification.

Example Machine Learning Model with Training-Support-Based Augmentation

The following example of training-support-based augmentation of a machine learning model will be described with respect to a classification model implemented as an artificial neural network ("NN"). However, training-support-based augmentation may be applied to any machine learning model, including but not limited to: neural-network-based regression models, linear regression models, logistic regression models, decision trees, random forests, support vector machines ("SVMs"), Naïve or a non-Naïve Bayes network, k-nearest neighbors ("KNN") models, k-means models, clustering models, or any combination thereof. For brevity, aspects of training-supported-based augmentation may not be described with respect to each possible machine learning model that may be used. In practice, however, many or all of the aspects of the disclosure may apply to other machine learning models, including but not limited to those listed herein. In addition, although certain embodiments are described with respect to using certain methods of estimating distributions and mixture densities of training data and/or features derived therefrom, other methods may be used.

Generally described, NNs—including deep neural networks ("DNNs"), convolutional neural networks ("CNNs"), recurrent neural networks ("RNNs"), other NNs, and combinations thereof—have multiple layers of nodes, also referred to as "neurons." Illustratively, a NN may include an input layer, an output layer, and any number of intermediate, internal, or "hidden" layers between the input and output layers. The individual layers may include any number of separate nodes. Nodes of adjacent layers may be logically connected to each other, and each logical connection between the various nodes of adjacent layers may be associated with a respective weight. Conceptually, a node may be thought of as a computational unit that computes an output value as a function of a plurality of different input values. Nodes may be considered to be "connected" when the input values to the function associated with a current node include the output of functions associated with nodes in a previous layer, multiplied by weights associated with the individual "connections" between the current node and the nodes in the previous layer. When a NN is used to process input data in the form of an input vector or a matrix of input vectors (e.g., a batch of training data input vectors), the NN may perform a "forward pass" to generate an output vector or a matrix of output vectors, respectively. The input vectors may each include n separate data elements or "dimensions," corresponding to the n nodes of the NN input layer (where n is some positive integer). Each data element may be a value, such as a floating-point number or integer. A forward pass typically includes multiplying the matrix of input vectors by a matrix representing the weights associated with connections between the nodes of the input layer and nodes of the next layer, and applying an activation function to the results. The process is then repeated for each subsequent NN layer. Some NNs have hundreds of thousands or millions of nodes, and millions of weights for connections between the nodes of all of the adjacent layers.

FIG. 1 is a diagram of an illustrative NN 100 with training-support-based augmentation that may be used in some embodiments. As shown, the example NN 100 has an input layer 110 with a plurality of nodes, one or more internal layers 112 with a plurality of nodes, and an output layer 116 with a plurality of nodes. The specific number of layers shown in FIG. 1 is illustrative only, and is not intended to be limiting. In some NNs, different numbers of internal layers and/or different numbers of nodes in the input, internal, and/or output layers may be used. For example, in some NNs the layers may have hundreds or thousands of nodes. As another example, in some NNs there may be 1, 2, 4, 5, 10, 50, or more internal layers. In some implementations, each layer may have the same number or different numbers of nodes. For example, the input layer 110 or the output layer 116 can each include more or less nodes than the internal layers 112. The input layer 110 and the output layer 116 can include the same number or different number of nodes as each other. The internal layers 112 can include the same number or different numbers of nodes as each other.

Input to a NN, such as the NN 100 shown in FIG. 1, occurs at the input layer 110. A single input to the NN 100 may take the form of an n-dimensional input vector with n data elements, where n is the number of nodes in the input layer 110. During training, the input vector may be a training data input vector 120. In some cases, multiple input vectors may be input into—and processed by—the NN 100 at the same time. For example, when the NN 100 is trained, a set of training data input vectors 120 (e.g., a "mini batch") may be arranged as an input matrix. In this example, each row of the input matrix may correspond to an individual training data input vector 120, and each column of the input matrix may correspond to an individual node of the input layer 110. The data element in any given training data input vector 120 for any given node of the input layer 110 may be located at the corresponding intersection location in the input matrix.

The connections between individual nodes of adjacent layers are each associated with a trainable parameter, such as a weight and/or bias term, that is applied to the value passed from the prior layer node to the activation function of the subsequent layer node. For example, the weights associated with the connections from the input layer 110 to the internal layer 112 it is connected to may be arranged in a weight matrix W with a size m×n, where m denotes the number of nodes in an internal layer 112 and n denotes the dimensionality of the input layer 110. The individual rows in the weight matrix W may correspond to the individual nodes in the input layer 110, and the individual columns in the weight matrix W may correspond to the individual nodes in the internal layer 112. The weight w associated with a connection from any node in the input layer 110 to any node in the internal layer 112 may be located at the corresponding intersection location in the weight matrix W.

Illustratively, the training data input vector 120 may be provided to a computer processor that stores or otherwise has access to the weight matrix W. The processor then multiplies the training data input vector 120 by the weight matrix W to produce an intermediary vector. The processor may adjust individual values in the intermediary vector using an offset or bias that is associated with the internal layer 110 (e.g., by adding or subtracting a value separate from the weight that is applied). In addition, the processor may apply an activation function to the individual values in the intermediary vector (e.g., by using the individual values as input to a sigmoid function or a rectified linear unit ("ReLU") function).

In some embodiments, there may be multiple internal layers 112, and each internal layer may or may not have the same number of nodes as each other internal layer 112. The weights associated with the connections from one internal layer 112 (also referred to as the "preceding internal layer") to the next internal layer 112 (also referred to as the "subsequent internal layer") may be arranged in a weight matrix similar to the weight matrix W, with a number of rows equal to the number of nodes in the subsequent internal layer 112 and a number of columns equal to the number of nodes in the preceding internal layer 112. The weight matrix may be used to produce another intermediary vector using the process described above with respect to the input layer 110 and first internal layer 112. The process of multiplying intermediary vectors by weight matrices and applying activation functions to the individual values in the resulting intermediary vectors may be performed for each internal layer 112 subsequent to the initial internal layer.

The intermediary vector that is generated from the last internal layer 112 prior to the output layer 116 may be referred to as a feature vector 114. The feature vector 114 includes data representing the features that have been extracted from the training data input vector 120 by the NN 100. Illustratively, the feature vector 114 may be thought of as defining a point in the feature space within which the NN 100 is configured to operate. The feature space is determined over the course of design and training of the model, and is expected to encompass the relevant features used to make accurate output determinations (e.g., classification determinations or regression determinations). Thus, the feature vector 114 generated from any given input vector 110 may be considered to be a processed, distilled representation of the relevant information regarding the input vector 110 from which an output determination is to be made.

The output layer 116 of the NN 100 makes output determinations from the feature vector 114. Weights associated with the connections from the last internal layer 112 to the output layer 116 may be arranged in a weight matrix similar to the weight matrix W, with a number of rows equal to the number of nodes in the output layer 116 and a number of columns equal to the number of nodes in the last internal layer 112. The weight matrix may be used to produce an output vector 118 using the process described above with respect to the input layer 110 and first internal layer 112.

The output vector 118 may include data representing the classification or regression determinations made by the NN 100 for the training data input vector 120. Some NNs are configured make u classification determinations corresponding to u different classifications (where u is a number corresponding to the number of nodes in the output layer 116, and may be less than, equal to, or greater than the number of nodes n in the input layer 110). The data in each of the u different dimensions of the output vector 118 may be a confidence score indicating the probability that the training data input vector 120 is properly classified in a corresponding classification. Some NNs are configured to generate values based on regression determinations. The output value(s) is/are based on a mapping function modeled by the NN. Thus, an output value from a NN-based regression model is the value that corresponds to the training data input vector 120.

The training data 102 from which the training data input vectors 120 are drawn may also include reference data output vectors 122. Each reference data output vector 122 may correspond to a training data input vector 120, and may include the "correct" or otherwise desired output that a model should produce for the corresponding training data input vector 120. For example, a reference data output vector 122 may include scores indicating the proper classification(s) for the corresponding training data input vector 120 (e.g., scores of 1.0 for the proper classification(s), and scores of 0.0 for improper classification(s)). As another example, a reference data output vector 122 may include scores indicating the proper regression output(s) for the corresponding training data input vector. The goal of training may be to minimize the difference between the output vectors 118 and corresponding reference data output vectors 122.

The feature vectors 114, in addition to being used to generate output vectors 118, may also be analyzed to determine various training-support-based metrics. Once the machine learning model has been trained, the training data input vectors 120 may be analyzed again using the trained NN 100 to generate feature vectors 114 and output vectors 118. In some embodiments, as shown, a training support modeler 130 may then analyze the output vectors 118 with respect to the corresponding reference data output vectors 122 to determine whether NN 100 has produced output in various training-support-based classes. In some embodiments, if the NN 100 is a classification model, the classes may include: a true positive classification ("TP"), a false positive classification ("FP"), a true negative classification ("TN"), and/or a false negative classification ("FN") for a given training data input vector 120. The feature vectors 114 generated from each training data input vector 120 may then be tagged or otherwise associated with the TP, FP, TN, and FN determinations. The training support modeler 130 may determine one or more training support distributions or related metrics for use in augmenting the classification determinations made by the trained machine learning model and/or for use by the machine learning model itself to generate the classification determinations. In some embodiments, if the NN 100 is a regression model, the classes may include: a small error, a large positive error, and/or a large negative error for a given training data input vector 120. The feature vectors 114 generated from each training data input vector 120 may then be tagged or otherwise associated with the small error, large positive error, and large negative error determinations. The training support modeler 130 may determine one or more training support distributions or related metrics for use in augmenting the regression determinations made by the trained machine learning model and/or for use by the machine learning model itself to generate the regression determinations.

An illustrative process for generating training support distributions for classification models is described in greater detail below with respect to FIGS. 2 and 3. Illustrative processes for using the training support distributions to augment a trained machine learning classification model are also described in greater detail below with respect to FIGS. 4-7. An illustrative process for generating training support distributions for regression models is described in greater detail below with respect to FIG. 8. Illustrative processes for using the training support distributions to augment a trained machine learning regression model are also described in greater detail below with respect to FIGS. 9-10.

Example Training and Support Modeling Process

FIG. 2 is a flow diagram of an illustrative process 200 for training a machine learning model, such as a classification model, and modeling the training support for augmentation of the trained machine learning model. Portions of the process 200 will be described with further reference to the illustrative NN 100 shown in FIG. 1, and the data diagrams shown in FIGS. 3A and 3B.

The process 200 begins at block 202. The process 200 may begin in response to an event, such as when a machine learning model is to be trained. It will be appreciated that the process 200 may be performed by a single computing device or set of computing devices. For example, when the process 200 is initiated, a set of executable program instructions stored on one or more non-transitory computer-readable media (e.g., hard drive, flash memory, removable media, etc.) may be loaded into memory (e.g., random access memory or "RAM") of a computing system, such as the computing system 1200 shown in FIG. 12. The training support modeler instructions 1214 may be loaded into memory 1210 of the computing system 1200 and executed by one or more processors 1202. In some embodiments, the process 200 or portions thereof may be implemented on multiple processors 1202 and/or multiple computing systems 1200, serially or in parallel.

At block 204, the computing system 1200 can train a machine learning model, such as the NN 100, using training data 102. The NN 100 may be trained by generating output vectors 118 for the training data input vectors 120, determining the difference between the output vectors 118 and corresponding reference data output vectors 122, and then adjusting parameters of the NN 100 (e.g., weights and/or bias terms of the NN 100) such that the NN 100 will subsequently produce output vectors 118 that are closer to the corresponding reference data output vectors 122.

The modification of parameter values may be performed through a process referred to as "back propagation." Back propagation includes determining the difference between the expected model output (e.g., the reference data output vectors 122) and the obtained model output (e.g., output vectors 118), and then determining how to modify the values of some or all parameters of the model to reduce the difference between the expected model output and the obtained model output. In some embodiments, a computing system may compute the difference using a loss function, such as a cross-entropy loss function, a L2 Euclidean loss function, a logistic loss function, a hinge loss function, a square loss function, or a combination thereof. The computing system can compute a derivative, or "gradient," that corresponds to the direction in which each parameter of the machine learning model is to be adjusted in order to improve the model output (e.g., to produce output that is closer to the correct or preferred output for a given training data input vector 120, as represented by the reference data output vector 122). The computing system can update one or more parameters of the machine learning model based on the gradient. For example, the computing system can update some or all parameters of the machine learning model using a gradient descent method. The adjustments may be propagated back through the NN 100 layer-by-layer.

The process of generating output vectors 118 from training data input vectors 120, determining the differences, and adjusting the parameters of the NN 100 may be repeated until one or more termination criteria are met. For example, the termination criteria can be based on the accuracy of the NN 100 as determined using the loss function, a number of iterations performed, a duration of time, or the like.

At block 206, the computing system 1200 can analyze training data input vectors 120 using the trained NN 100 to generate model evaluation output. The model evaluation output can then be analyzed to evaluate the performance of the NN 100 and model the training support in different regions of the feature space within which the NN 100 is configured and trained to operate. In some embodiments, the NN 100 may generate model evaluation output including feature vectors 114 and training data output vectors 118 from training data input vectors 120. Illustratively, training data input vectors 120 may include all training data input vectors 120 that were used to train and/or test the NN 100. The resulting feature vectors 114 and training data output vectors may be provided to the training support modeler 130 or some other module or component of the computing system 1200.

At block 208, the training support modeler 130 or some other module or component of the computing system 1200 may analyze the training data output vectors 118 with respect to the corresponding reference data output vectors 122. In contrast to the analysis that is performed during training (e.g., based a value obtained by evaluating a loss function), the analysis may be performed to categorize the training data output vectors 118—and the feature vectors 114 from which they were generated—into various accuracy determination sets, also be referred to as accuracy categories. In some embodiments, the accuracy categories relate to the nature of the classification determination of the NN 100 (e.g., whether a training data input vector 120 is determined to be within or outside of a particular classification) and also the accuracy of the classification determination (e.g., whether the classification determination is correct or incorrect when compared to the reference data output vector 122). Determinations that a training data input vector is to be classified within a particular classification may be referred to as "positive" determinations with respect to that particular classification, whereas determinations that the training data input vector 120 is not to be classified within the particular classification may be referred to as "negative" determination with respect to the particular classification. Classification determinations that are correct when analyzed with respect to the corresponding reference data output vector 122 may be referred to as "true" determinations, whereas classification determinations that are incorrect when analyzed with respect to the corresponding reference data output vector 122 may be referred to as "false" determinations. Combining these two different aspects of the classification determinations yields a set of four categories: true positives ("TP"), true negatives ("TN"), false positives ("FP"), and false negatives ("FN").

In some embodiments, additional and/or alternative accuracy categories may be used, such as when there are more than two possible classifications, when the classifications are not mutually exclusive, and/or when a given classification has more than two possible states. For example, if there are three possible classifications that are mutually exclusive, then there may be six total accuracy categories per classification: classification 1 true positive, classification 1 true negative, classification 1 false positive with classification 2 false negative, classification 1 false positive with classification 3 false negative, classification 1 false negative with classification 2 false positive, and classification 1 false negative with classification 3 false positive. Additional distributions may be determined for the other classifications. In the present example with three possible classifications that are mutually exclusive, there may be 9 such cases overall as follows, where the first number is the true classification, and the second number is the classification determined using the model: (1,1) (1,2) (1,3) (2,1) (2,2) (2,3) (3,1) (3,2) (3,3).

As another example, if there are two possible classifications that are not mutually exclusive, then there may be six total accuracy categories per classification: classification 1 true positive, classification 1 true negative, classification 1 false positive with classification 2 true positive, classification 1 false positive with classification 2 false positive, classification 1 false negative with classification 2 true positive, and classification 1 false negative with classification 2 false positive. Additional distributions may be determined for the other classification.

As another example, any given classification may have more than two states, such as a positive state, a neutral state, and a negative state. In general, as the number of classifications and/or states grow, the number of accuracy categories may grow as well. The example sets of classifications and accuracy categories described herein are illustratively only, and are not intended to be exhaustive or limiting.

The determination of which category a particular output vector 118—and the feature vector 114 from which it was generated—is to be placed may be based on one or more rules, models, or other analyses. In some embodiments, an evaluation function may receive, as input, the output vector 118 and corresponding reference data output vector 122 as input. The evaluation function may determine the nature of the classifications represented by the vectors (whether they represent positive or negative classification determinations), and the difference—if any—between the classifications represented by the vectors. If the difference (if any) between the output vector 118 and reference data output vector 122 satisfies one or more similarity criteria, then the output vector may be categorized as a "TP" or "TN," depending upon whether the classification determination represented by the vectors is positive or negative. However, if the difference between the output vector 118 and reference data output vector 122 fails to satisfy one or more similar criteria (or satisfies one or more difference criteria), then the output vector may be categorized as a "FP" or "FN," depending upon whether the classification determination represented by the output vector 118 is positive or negative.

By way of example, an output vector 118 may include a value of 0.70 for a particular classification. The corresponding reference data output vector 118 may indicate that the proper classification determination is positive, such as by including a value of 0.99 or 1.00 for the classification. An evaluation function may apply one or more criteria to determine whether the output vector 118 is similar to the reference data output vector 122, such as requiring the output vector 118 value to be greater than or equal to 0.5 to be considered to be a "true positive" result, whereas a value of less than 0.5 will be considered to be a "false negative" result.

At block 210, the training support modeler 130 or some other module or component of the computing system 1200 may determine one or more distributions of feature data, as represented by feature vectors 114 generated from the training data input vectors 120. Each feature vector 114 may represent a point in the feature space within which the NN 100 is configured and trained to operate. Distributions of the feature data represented by the feature vectors 114 may therefore be distributions of such points within the relevant feature space. Because the distributions are determined from feature vectors 114 generated during training, the distributions represent the density of the features observed during training. Areas of greater density may thus represent areas in which more training data was observed than areas of lower density.

As discussed in greater detail below, classification of subsequent feature vectors that fall within areas of higher density may be treated differently than classification of subsequent feature vectors that fall within areas of lower density, depending upon the particular density being considered. For example, feature vectors associated with areas of higher density in a distribution of TPs or TNs may be considered to have more training-based support—and classification determinations based on these feature vectors may be considered more reliable—than feature vectors associated with areas of lower density in these distributions. In contrast, feature vectors associated with areas of higher density in a distribution of FPs or FNs may be considered to have less relevant training-based support— and classification determinations based on these feature vectors may be considered less reliable—than feature vectors associated with areas of lower density in these distributions. As another example, feature vectors associated with areas of high density in a distribution of all feature vectors considered during training may be considered to have more training-based support—and classification determinations based on these feature vectors may be considered more reliable—than feature vectors associated with areas of lower density in this distribution.

The distributions of feature vectors may be modeled using one or more of a variety of methods. In some embodiments, a single distribution may be modeled as a normal distribution—also referred to as a Gaussian distribution—or as a Gaussian mixture model ("GMM"). A GMM represents a set of data using a set of Gaussian distributions. Individual data points in the data set—in this example, individual feature vectors 114—may be more or less likely to be drawn from the various subsets represented by each Gaussian distribution in the GMM. Generally, points closer to the mean of one Gaussian distribution are more likely to be drawn from the subset represented by that Gaussian than from a subset represented by a Gaussian distribution with mean from which they are farther away. By modeling the entire data set as a collection of subsets represented by individual Gaussian distributions, complex data sets that do not follow a normal distribution curve may nevertheless be modeled using normal distribution functions.

For a GMM representing a distribution of n-dimensional feature vectors 114, the mean of each Gaussian distribution in the GMM may be an n-dimensional vector and the covariance may be an n×n covariance matrix. In addition, each Gaussian distribution (also referred to simply as a "Gaussian") in the GMM may be associated with a mixture weight. The mean and covariance describe the shape of the distribution, and the mixture weight is used to assign more or less weight to individual Gaussians when combining the outputs from each into a single output for the GMM. One example method for generating a GMM from a data set of feature vectors 114 may be implemented using the expectation maximization ("EM") algorithm as follows: make initial value assignments to the mean and covariance matrix parameters of each of the individual Gaussians in the GMM; compute the likelihood, for each data point in the data set being modeled, that the data point is associated with Gaussian (this is the "expectation" step of EM); compute the weighted means and covariance matrices for the individual Gaussians (this is the "maximization" step of EM); and iteratively repeat the expectation and maximization steps with newly computed parameters until a convergence criterion has been met.

In some embodiments, a separate GMM may be generated for each of the feature vector categories of interest to the application. Returning to the example above, there may be four GMMs: a first GMM of feature vectors 114 in the TP category, a second GMM of feature vectors 114 in the TN category, a third GMM of feature vectors 114 in the FP category, and/or a fourth GMM of feature vectors 114 in the FN category. The likelihood that a given point represented by a single feature vector 114 is drawn from a data set modeled by a particular GMM therefore represents the likelihood that the point is associated with a TP, TN, FP, or FN.

In some embodiments, a GMM may be generated for all feature vectors generated from the training data (e.g., regardless of whether the feature vectors are associated with TPs, TNs, FPs, or FNs). Thus, the GMM would represent the areas within the feature space where training has occurred, and the density of such training observations that were considered during training. In some embodiments, a GMM may be generated for all feature vectors associated with a P classification indicated by the corresponding reference data output vectors, regardless of whether the classifications represented by the training data output vectors are TPs or FNs. In some embodiments, a GMM may be generated for all feature vectors associated with an N classification indicated by the corresponding reference data output vectors, regardless of whether the classifications represented by the training data output vectors are TNs or FPs. In some embodiments, a GMM may be generated for all feature vectors associated with an accurate classification indicated by the corresponding reference data output vectors, regardless of whether the classifications represented by the training data output vectors are TPs or TNs. In some embodiments, a GMM may be generated for all feature vectors associated with an inaccurate classification indicated by the corresponding reference data output vectors, regardless of whether the classifications represented by the training data output vectors are FPs or FNs.

Figure 3A:
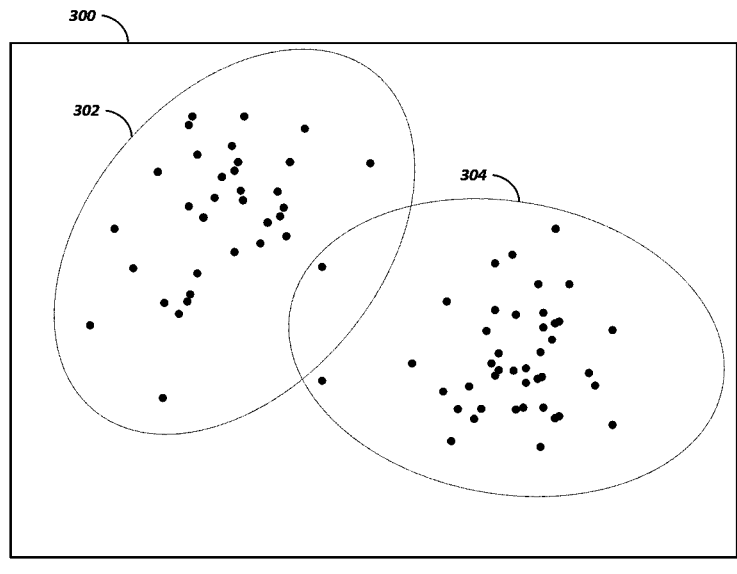
FIGS. 3A and 3B are diagrams of illustrative distributions of a training feature space according to some embodiments.

FIG. 3A is a diagram of an illustrative distribution 300 of points in a two-dimensional feature space as modeled by a GMM. In the illustrated example, the GMM includes two separate Gaussian components 302 and 304. As shown, the entire GMM distribution 300 does not include a hard separation between the Gaussian components 302, 304. Rather, individual data points modeled by the GMM may be more or less likely to come from each of the components 302 and 304, depending upon the distance of the individual data points from the mean of the individual components and the covariance of the components. The distribution 300 is shown in two-dimensional form for purposes of illustration only. In some embodiments, the feature space modeled by the GMM may have 1, 2, 3, or more dimensions, and thus the points in the feature space represented by feature vectors may also have 1, 2, 3, or more dimensions.

In some embodiments, a distribution may be modeled as one or more clusters using a clustering algorithm. In clustering, a data set is partitioned into different clusters in which each data point belongs to one of the clusters such that the data points are separated into clusters of "similar" data points. By modeling an entire data set as a collection of individual subsets represented by individual clusters, complex data sets with irregular distributions may be modeled. In the present example, the feature space in which the model is configured to operate may be modeled as sets of different clusters corresponding to TPs, TNs, FPs, and FNs. One example method for determining the clusters of similar feature vectors 114 may be implemented using the k-means clustering algorithm as follows: make initial value assignments to the mean values (or "centroids") of each of the k individual clusters, where k is a positive integer; compute the Euclidian distance between each point in the data set and each of the k clusters; assign each point in the data set to the cluster to which it is the closest; calculate new means of the data points assigned to each cluster; and iteratively repeat the distance calculation, assignment, and means calculation steps until a convergence criterion has been met. This process may be performed separately for each of the four categories (TPs, TNs, FPs, and FNs) and/or a single clustering process may be performed for all feature vectors.

Figure 3B:
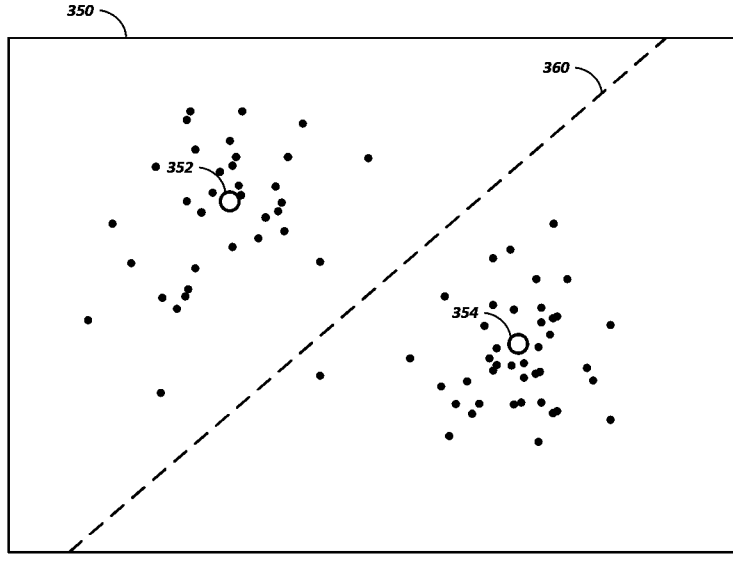

FIG. 3B is a diagram of an illustrative distribution 350 of points in a two-dimensional feature space as modeled using k-means clustering. In the illustrated example, there are two separate centroids 352 and 354. As shown, there is a hard separation 360 in the distribution 350. Thus, individual data points are each assigned to only one cluster with one centroid 352 or 354, respectively, depending upon the distance of the individual data points from the centroids 352, 354. The distribution 350 is shown in two-dimensional form for purposes of illustration only. In some embodiments, the feature space modeled by the clusters may have 1, 2, 3, or more dimensions, and thus the points in the feature space represented by feature vectors may also have 1, 2, 3, or more dimensions.

The techniques described herein, among others, may also or alternatively be used in embodiments where more than two classifications are used, where classifications are not mutually exclusive, and/or where individual classifications are not necessarily binary (e.g., any given classification may have more than two states). For example, when there are three mutually-exclusive binary classifications, there may be 9 possible combinations of true classification and determined classification. Thus, there may be 9 separate distributions determined. In some cases, a distribution may be generated for all feature space points instead of, or in addition to, any or all of the individual classification distributions. In some embodiments, a distribution may be generated for all feature space points determined to be in a particular classification (e.g., three such distributions may be generated in the case where there are 3 classifications). In some embodiments, a distribution may be generated for all feature space points determined not to be in a particular classification (e.g., three such distributions may be generated in the case where there are 3 classifications).

The example distribution modelling methods described herein are illustrative only, and are not intended to be exhaustive, required, or limiting. In some embodiments, additional and/or alternative distribution modeling methods may be used, individually or in combination, to model the feature space within which the machine learning model has been configured to operate and/or different categories of features observed during training of the machine learning model.

At block 212, the training support modeler 130 or some other module or component of the computing system 1200 may augment the NN 100 based on the distributions determined above. Augmentation using the distributions may include configuring the NN 100 to determine a classification score—or modify a determined classification score—based on the distributions. For example, if the feature vector 114 generated from a particular input vector is likely to be associated with a FP or FN (or is otherwise associated with otherwise inadequate training-based support), then the classification score may be adjusted to reflect this uncertainty. Augmentation using the distributions may also or alternatively include configuring the NN 100—or a component (e.g., computing device or subsystem) that uses the NN 100—to generate a separate training-based support metric that indicates the training basis for the classification determination made by the NN 100. The training-based support metric may be determined using one or more of the distributions described herein. For example, the training-based support metric may be a discrete value, such as a binary value, indicating adequate or inadequate training-based support. As another example, the training-based support metric may be a continuous value, such as a value within the range

[0.0, 1.0], indicating a degree to which there is training-based support for the classification determination.

The process 200 may terminate at block 214.

Some example augmentation methods are described in greater detail below. However, the example augmentation methods described herein are illustrative only, and are not intended to be exhaustive, required, or limiting. In some embodiments, additional and/or alternative augmentation methods may be used, individually or in combination.

Examples of Generating Augmented Classification Output

Figure 4:
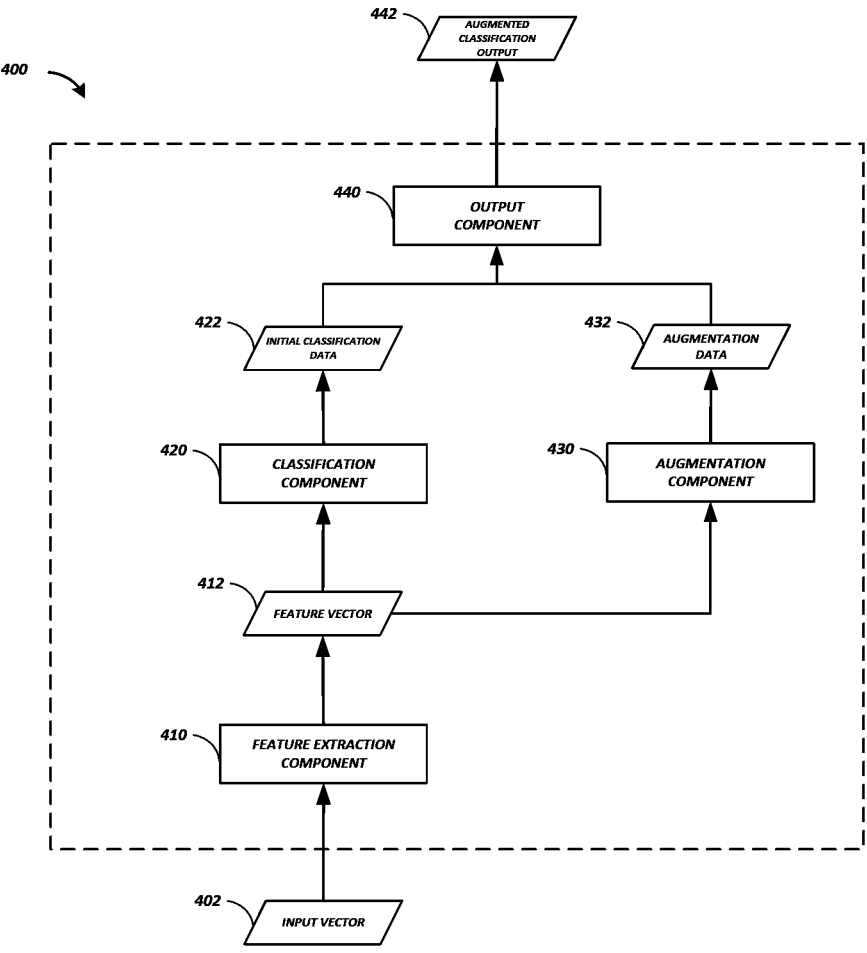
FIG. 4 is a diagram of an illustrative artificial neural network with a training support classification component according to some embodiments.

FIG. 4 is a diagram of an illustrative machine learning model 400 (also referred to simply as a "model" for convenience) configured to generate augmented classification output according to some embodiments. As shown, the model 400 includes a feature extraction component 410, a classification component 420, an augmentation component 430, and an output component 440. The model 400 is used to analyze an input, such as an input vector 402. During the course of analyzing the input vector 402, the feature extraction component 410 processes the input vector 402 and generates a feature vector 412 that represents a point of the feature space in which the model 400 is configured and trained to operate. The feature vector 412 may be used by the classification component 420 to generate initial classification data 422, and by the augmentation component 430 to generate augmentation data 432. The output component 440 may then generate augmented classification output 442 using the initial classification data 422 and augmentation data 432.

Figure 5:
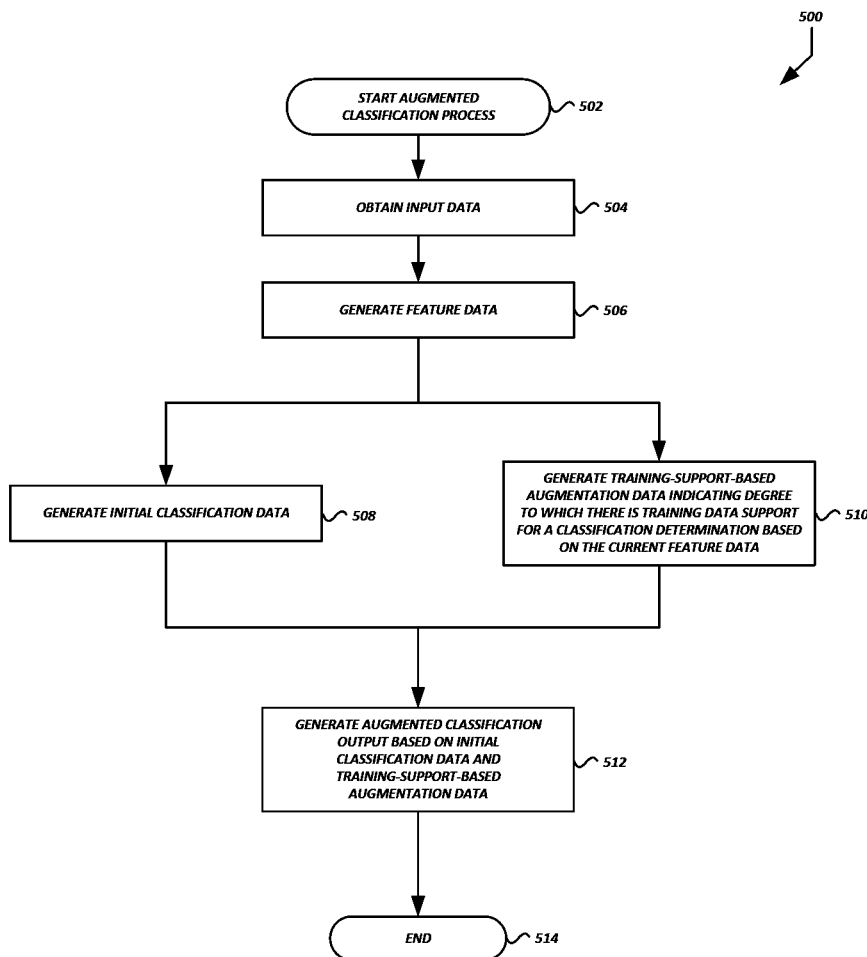
FIG. 5 is a flow diagram of an illustrative process for generating classification output using an artificial neural network with a training support augmentation component according to some embodiments.

FIG. 5 is a flow diagram of an illustrative process 500 that may be performed using the model 400 shown in FIG. 4 to generate augmented classification output 442. The process 500 begins at block 502. It will be appreciated that the process 500 may be performed by a single computing device or set of computing devices. For example, when the process 500 is initiated, a set of executable program instructions stored on one or more non-transitory computer-readable media (e.g., hard drive, flash memory, removable media, etc.) may be loaded into memory (e.g., random access memory or "RAM") of a computing system, such as the computing system 1200 shown in FIG. 12. The augmented machine learning model application instructions 1216 may be loaded into memory 1210 of the computing system 1200 and executed by one or more processors 1202. In some embodiments, the process 500 or portions thereof may be implemented on multiple processors 1202 and/or multiple computing systems 1200, serially or in parallel.

At block 504, the computing system 1200 can obtain an input vector 402. The input vector 402 may be an n-dimensional vector of data to be classified by the model 400.

At block 506, the computing system 1200 can generate a feature vector 412 from the input vector 402 using the feature extraction component 410. In some embodiments, the feature extraction component 410 may include portions of a neural network, such as the input layer and one or more internal layers. The output of one or more of the internal layers may be the feature vector 412. For example, the feature vector 412 may include output of the last internal layer, the second-to-last internal layer, or a combination of data from multiple internal layers.

At block 508, the computing system 1200 can generate initial classification data 422 from the feature vector 412. In some embodiments, the initial classification data 422 generated from the current feature vector 412 may be an initial classification score denoted C1(x), where x is the feature space point represented by the current feature vector 412. Illustratively, the initial classification score C1(x) may be a score in a range between two endpoints, where one endpoint indicates the highest confidence that the feature space point x is properly classified in a particular class, and the other endpoint indicates the lowest confidence that the feature space point x is properly classified in the particular class. For example, the initial classification score C1(x) may be a floating point value in the range [0.0, 1.0], where the highest values indicate the strongest confidence in the feature space point x being assigned to the particular class C, the lowest values indicate the strongest confidence in the feature space point x not being assigned to the particular class C, and values in the middle indicate a relative lack of confidence.

At block 510, the computing system 1200 can generate augmentation data 432 from the feature vector 412. In some embodiments, the augmentation component 430 may generate augmentation data 432 as a training-based support metric that indicates the degree to which the current point in the feature space, represented by the current feature vector 412, is supported by the training process. For example, the training-based support metric may indicate the density of feature space points in the training data set that are in the same area as the feature space point represented by the current feature vector 412. The density may be a density of all feature space points observed during training, or an accuracy-based density such as the density of TPs, TNs, FPs, and/or FNs. As another example, the augmentation component 430 may be a classifier trained to classify points in the feature space as anomalous or not anomalous (e.g., the augmentation component 430 may be an "anomaly detector"). The degree to which a particular point in the feature space is anomalous may be due to the feature data being associated with a relatively large number of false positives or false negatives in training data set, due to the feature data being associated with a relatively small quantity of similar training data inputs, or some other indicia of anomaly in the data. In this example, the augmentation component 430 may be a classifier that is trained using the feature vectors generated during training and their overall distribution and/or corresponding categorizations of TP, TN, FP, and/or FN.

The augmentation data 432 generated for the current vector 412 may be denoted A(x). The example that follows assumes that A(x) is determined using x, which is a point in the feature space represented by the current feature vector 412. However, in some embodiments the augmentation data 432 may be A(y) and computed using a different point, such as a point y in the input space represented by the current input vector 402, or some other point derived therefrom.

AP(x) may be a score in a range between two endpoints, where one endpoint indicates the highest degree of training-based support for feature space points such as those represented by the feature space point x, and the other endpoint indicates the lowest degree of training-based support for feature space points such as those represented by the feature space point x. For example, the augmentation data AP(x) may be a floating-point value in the range [0.0, 1.0], where higher values indicate greater training-based support. In this example, a higher number of points in the feature space region corresponding to the point represented by feature space point x were observed during training, a higher number of TPs and/or TNs were observed for such points in the feature space during training, a lower number of FPs and/or FNs were observed for such points in the feature space during training, etc. Alternatively, an anomaly detector may produce a value A(x) indicating the degree to which the present feature space point x is anomalous. For example, feature space point x may be considered an outlier with respect to the set of feature space points observed during training, and the resulting value A(x) may be higher than for a feature space point that is not considered an outlier. In these cases, the value A(x) may be converted to augmentation data AP(x) by penalizing outliers using equation [1] below:

$$AP(x)=1-A(x) \qquad [1]$$

Thus, using AP(x) as a weight would reduce the classification score in proportion to the degree to which the feature space point x is an outlier. The remainder of the present example will use the term AP(x) for the augmentation data 432.

At block 512, the computing system 1200 can generate augmented classification output 442 using the initial classification data 422 and augmentation data 432. In some embodiments, the augmentation data 432 may be used as a weighting factor such that the initial classification data 422 is reduced when there is a lack of training-based support. One embodiment of the process 500 that uses augmentation data 432 as a weighting factor applied to the initial classification data 422 to produce augmented classification output 442 may be implemented as follows:

First, increase the range of the initial classification score to allow for a greater degree of uncertainty in the classification decision. This may be performed by the output component 440. In some embodiments, the range may be doubled using equation [2] below:

$$C2(x)=2*C1(x)-1 \qquad [2]$$

In this case, the range of C2(x) is [−1.0, 1.0] where a value of 1.0 indicates a member of class C with strongest confidence, a value of −1.0 indicates not a member of class C with the strongest confidence, and 0 indicates uncertainty. In some embodiments, the range may not be increased, and therefore this step may not be performed. The remainder of the following example uses the increased range of C2(x).

Next, apply the augmentation data as a weight to the classification score to generate an augmented classification score. This may be performed by the output component 440. In some embodiments, application of the weight may be achieved using equation [3] below:

$$C3(x)=C2(x)*AP(x) \qquad [3]$$

In this example, the range of C3(x) is the same as the range of C2(x): [−1.0, 1.0]. A value of 1.0 indicates a member of class C with strongest confidence, a value of −1.0 indicates not a member of class C with the strongest confidence, and 0 indicates uncertainty. In particular, C3(x) is close to 0.0 when there is either too little training data in that region (e.g., the feature space point x is an outlier), the classification component 420 is uncertain about the classification, or both. When C3(x) is close to 1.0, then both the confidence in the classification decision and the training-based support for the feature space point are strong.

Finally, modify the range of the weighted classification score to the range typically expected by consumers of classification output. This may be performed by the output component 440. In some embodiments, the range may be compressed using equation [4] below:

$$C4(x)=C3(x)/2.0+0.5 \qquad [4]$$

The range of C4(x) is the traditional classification score range of [0.0, 1.0]. The output component 440 may then output the value of C4(x) as the augmented classification output 442. In some embodiments, the range may not be modified. Rather, the weighted classification C3(x) may be used as the augmented classification output 442, and consumers of the augmented classification output 442 may perform their own scaling or other range modification if desired.

Combining the augmentation data A(x) and initial classification score C1(x) into a single scalar value C3 or C4 as augmented classification output 442 reduces the amount of available information, since the single resulting value is not able to convey whether the uncertainty, if any, is related to the inability of the classification component 420 to classify the feature space point with confidence, or due to a lack of adequate training-based support as determined by the augmentation component 430. In some embodiments, rather than combining the augmentation data A(x) and initial classification score C1(x) into a single scalar value, the output component 440 may generate a multi-dimensional augmented classification output 442 that includes both the augmentation data A(x) and the classification score C1(x), or values derived therefrom. In this way, consumers of the augmented classification output 442 can apply their own processing to account for different degrees of training-based support fort the classification score.

The process 500 may terminate at block 514.

Figure 6:
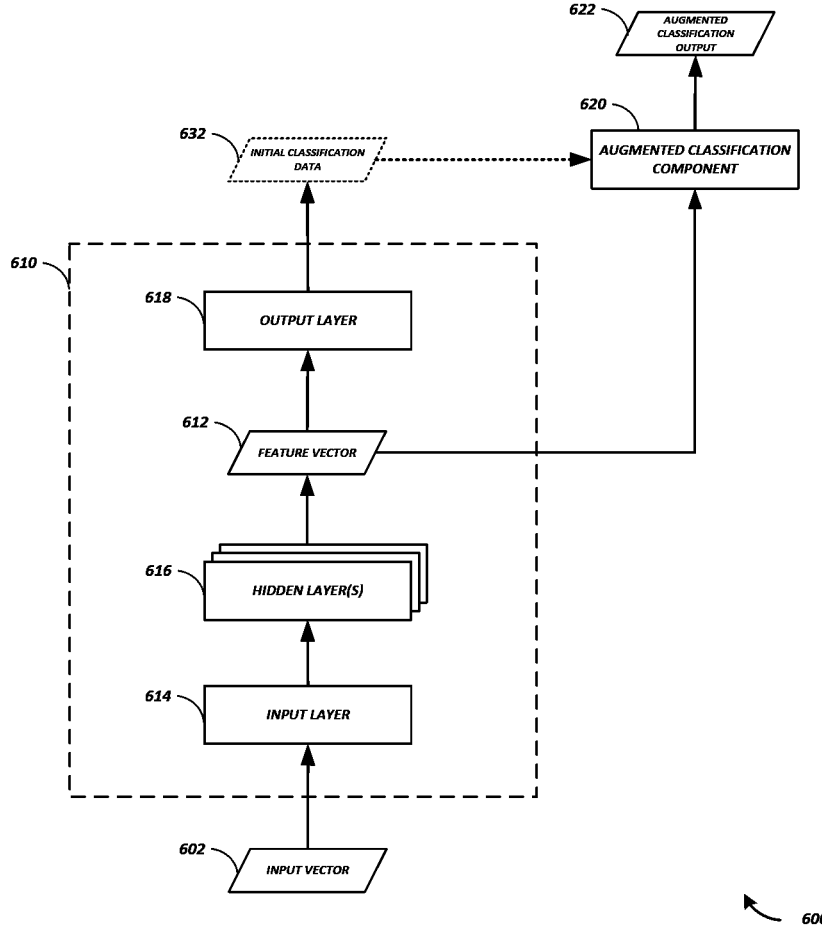
FIG. 6 is a diagram of an illustrative artificial neural network with a classification component configured to use feature data and training support data to generate augmented classification output according to some embodiments.

Turning now to FIG. 6, a different example of generating augmented classification output will be described. FIG. 6 is a diagram of an illustrative machine learning model 600 (also referred to simply as a "model" for convenience) configured to generate augmented classification output according to some embodiments. As shown, the model 600 includes a neural network component 610 and an augmented classification component 620. The neural network component 610 generates a feature vector 612 from an input vector 602. The feature vector 612 is provided to the augmented classification component 620, which generates augmented classification output 622. Advantageously, the augmented classification component 620 may use a model that models the feature vectors observed during training with respect to the various classification determinations observed during training. Thus, the augmented classification component 620 may generate augmented classification output 622 that is related to the classification determinations upon which the model 600 was trained. Moreover, the augmented classification output 622 may be generated without necessarily generating initial classification data and using augmentation data as a weighting factor or separate output dimension, as in the example above.

Figure 7:
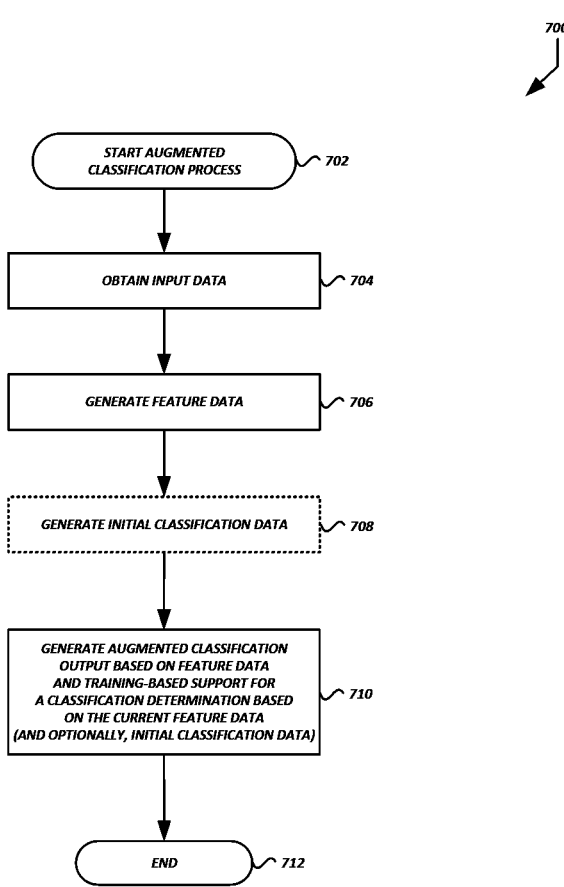
FIG. 7 is a flow diagram of an illustrative process for generating classification output using an artificial neural network with a classification component configured to use feature data and training support data to generate augmented classification output according to some embodiments.

FIG. 7 is a flow diagram of an illustrative process 700 that may be performed using the model 600 shown in FIG. 6 to generate augmented classification output 622.

The process 700 begins at block 702. It will be appreciated that the process 700 may be performed by a single computing device or set of computing devices. For example, when the process 700 is initiated, a set of executable program instructions stored on one or more non-transitory computer-readable media (e.g., hard drive, flash memory, removable media, etc.) may be loaded into memory (e.g., random access memory or "RAM") of a computing system, such as the computing system 1200 shown in FIG. 12. The augmented machine learning model application instructions 1216 may be loaded into memory 1210 of the computing system 1200 and executed by one or more processors 1202. In some embodiments, the process 700 or portions thereof may be implemented on multiple processors 1202 and/or multiple computing systems 1200, serially or in parallel.

At block 704, the computing system 1200 can obtain an input vector 602. The input vector 602 may be an n-dimensional vector of data to be classified by the model 600.

At block 706, the computing system 1200 can generate a feature vector 612 from the input vector 602 and provide the feature vector 612 to the augmented classification component 620. In some embodiments, as shown in FIG. 6, the feature vector 612 may be generated using a neural network 610. Illustratively, the neural network 610 includes an input layer 614 to receive the input vector 602, one or more hidden layers 616 to generate the feature vector 612 from the input vector 602, and optionally an output layer 618. The feature vector 612 may be the output generated by the last hidden layer 616, prior to an initial classification score 632 being generated by the output layer 618. In some embodiments, there may be no output layer 618, and therefore the feature vector 612 may be final output of the neural network component 610 of the model 600.

At block 708, computing system 1200 can generate an initial classification score 632 and provide it to the augmented classification component 620. The initial classification score may be generated from the feature vector 612 using the output layer 618 of the neural network component 610. For example, the output layer 618 may be a softmax layer that generates one or more classification scores from the feature vector 612. In some embodiments, there may be no output layer 618, and thus no initial classification score 632 is generated. In some embodiments, an initial classification score 632 is generated but is discarded or otherwise not provided to the augmented classification component 620. For example, the initial classification score 632 may be provided as output in addition to the output of the augmented classification component 620.

At block 710, the computing system 1200 can generate augmented classification output 622 from the feature vector 612, and optionally from the initial classification score 632 if there is one. The augmented classification component 620 may use a model that jointly models the feature space points observed during training and the classification determinations made based on those feature space points. In some embodiments, the augmented classification component 620 may be a Bayesian classifier. The Bayesian classifier may be configured to address uncertainty that is not (or not only) due to a lack of training data, but uncertainty due to regional performance issues in the feature space. For example, in some parts of the feature space there may have been an abundance of observations during training, but also a disproportionately large number of errors (FPs and FNs). The Bayesian classifier can address these errors by making classification determinations based on the quantity and ratio of positive and negative observations associated with the feature space during training, where the set of all positive observations includes TPs and FNs, and where the set of all negative observations includes TNs and FPs. In one embodiment, the Bayesian classifier may be configured as follows:

The probability of a positive classification given a particular feature space point x represented by feature vector 612 may be denoted P(P|x). This probability may be computed as the sum of the probability of a true positive given x, denoted P(TP|x), and the probability of a false negative given x, denoted P(FN|x). The probability of a negative classification given x may be denoted P(N|x), and may be computed as the sum of the probability of a true negative given x, denoted P(TN|x), and the probability of a false positive given x, denoted P(FP|x). Thus, to determine the probabilities P(P|x) and P(N|x), the probabilities of all TPs, FPs, TNs, and FNs may first be estimated from the observations associated with the training data set using equations [5]-[8], respectively, below:

$$P(TP) = (\# \text{ TP in data set})/(\# \text{ of points in data set}) \qquad [5]$$

$$P(FP) = (\# \text{ FP in data set})/(\# \text{ of points in data set}) \qquad [6]$$

$$P(TN) = (\# \text{ TN in data set})/(\# \text{ of points in data set}) \qquad [7]$$

$$P(FN) = (\# \text{ FN in data set})/(\# \text{ of points in data set}) \qquad [8]$$

The probability of a positive classification P given a feature space point x may then be found using equations [9]-[12] below:

$$P(P \mid x) = P(TP \mid x) + f(FN \mid x) \qquad [9]$$

$$P(TP \mid x) = \frac{P(TP, x)}{P(x)} = \frac{P(x \mid TP)P(TP)}{P(x)} \qquad [10]$$

$$P(FN \mid x) = \frac{P(FN, x)}{P(x)} = \frac{P(x \mid FN)P(FN)}{P(x)} \qquad [11]$$

$$P(P \mid x) = \frac{P(x \mid FN)P(FN) + P(x \mid TP)P(TP)}{P(x)} \qquad [12]$$

where P(x|TP) and P(x|FN) are determined from the mixture density functions for the distributions of TP and FN determined above (e.g., using the GMMs for TPs and FNs, respectively). The probability of a negative classification N given the feature space point x may be found using equations [13]-[16] below:

$$P(N \mid x) = P(TN \mid x) + P(FP \mid x) \qquad [13]$$

$$P(FP \mid x) = \frac{P(FP, x)}{P(x)} = \frac{P(x \mid FP)P(FP)}{P(x)} \qquad [14]$$

$$P(TN \mid x) = \frac{P(TN, x)}{P(x)} = \frac{P(x \mid TN)P(TN)}{P(x)} \qquad [15]$$

$$P(N \mid x) = \frac{P(x \mid TN)P(TN) + P(x \mid FP)P(FP)}{P(x)} \qquad [16]$$

where P(x|TN) and P(x|FP) are determined from the mixture density functions for the distributions of TN and FP determined above (e.g., using the GMMs for TNs and FPs, respectively). Note that the term P(x) occurs in the denominator of both P(P|x) and P(N|x), and therefore it does not impact the ratio of the two probabilities, described below. Thus, determining P(x) is not necessary.

The Bayesian probability of a positive classification P or negative classification N, given a feature space point x, may be determined using the ratio of P(N|x) to P(P|x) because these two probabilities account for all possible classifications for the data set modeled by the feature space in which x occurs. This ratio, denoted R, may be determined using equation [17] below:

$$R = \frac{P(N \mid x)}{P(P \mid x)} = \frac{P(x \mid TN)P(TN) + P(x \mid FP)P(FP)}{P(x \mid FN)P(FN) + P(x \mid TP)P(TP)} \qquad [17]$$

Note that to estimate P(TP), P(FP), P(TN), and P(FN), it is not necessary to determine the quantity of all points in the data set so long as the quantities of TPs, TNs, FPs, and FNs are determined, because the quantity of all points in the data set occurs in the denominators of each of probability estimates P(TP), P(FP), P(TN), and P(FN) of equation [17] when expanded using equations [5]-[8]. Thus, in some embodiments R may be determined directly from the mixture density functions for the distributions of TPs, TNs, FPs, and FNs, and the quantities of TPs, TNs, FPs, and FNs in the data set, using equation [18] below:

$$R = \frac{P(N\,|\,x)}{P(P\,|\,x)} = \frac{\begin{array}{c}P(x\,|\,TN)(\#\text{ of } TN \text{ in data set}) + \\ P(x\,|\,FP)(\#\text{ of } FP \text{ in data set})\end{array}}{\begin{array}{c}P(x\,|\,FN)(\#\text{ of } FN \text{ in data set}) + \\ P(x\,|\,TP)(\#\text{ of } TP \text{ in data set})\end{array}} \qquad [18]$$

Then, given R and identities [19] and [20] below, the probabilities P(P|x) and P(N|x) may be determined using equations [21] and [22], respectively:

$$P(N|x)+P(P|x)=1 \qquad [19]$$

$$R*P(P|x)+P(P|x)=1 \qquad [20]$$

$$P(P|x)=1/(R+1) \qquad [21]$$

$$P(N|x)=R/(R+1) \qquad [22]$$

The augmented classification output 622 may be the value of P(P|x), the value of P(N|x), or a multi-value output with both values. In some embodiments, the augmented classification output 622 may be a multi-value output that includes the initial classification score 632.

In some embodiments, augmented classification output 622 may be conditioned upon the initial classification score 632 by using the initial classification score 632 as another input to a Bayesian classifier. For example, if the initial classification score 632 for a feature space point x is representative of a positive classification determination (denoted CP) for a particular classification, then the following probabilities are determinable:

$$P(FP\,|\,x, CP) = \frac{P(FP, X, CP)}{P(X, CP)} = \frac{P(x\,|\,FP, CP)P(FP, CP)}{P(x, CP)} \qquad [23]$$

$$P(TP\,|\,x, CP) = \frac{P(TP, x, CP)}{P(x, CP)} = \frac{P(x\,|\,TP, CP)P(TP, CP)}{P(x, CP)} \qquad [24]$$

$$R2 = \frac{P(FP\,|\,x, CP)}{P(TP, x, CP)} \qquad [25]$$

$$P(FP\,|\,x, CP) + P(TP\,|\,x, CP) = 1 \qquad [26]$$

$$P(TP\,|\,x, CP) * (R2 + 1) = 1 \qquad [27]$$

$$P(TP\,|\,x, CP) = 1/(R2 + 1) \qquad [28]$$

The augmented classification output 622 may be the value of P(TP|x, CP). In some embodiments, the augmented classification output 622 may be a multi-value output that includes the value of P(TP|x, CP) and the initial classification score 632.

The process 700 may terminate at block 712.

Example Regression Model Training and Support Modeling Process

Figure 8:
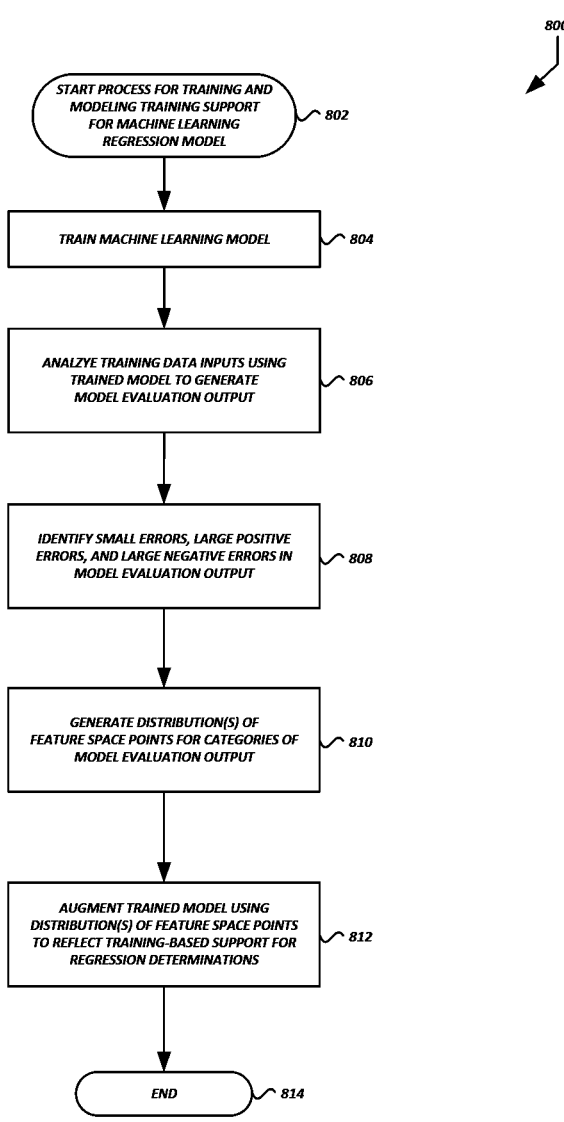
FIG. 8 is a flow diagram of another illustrative process for training-support-based augmentation of an artificial neural network according to some embodiments.

FIG. 8 is a flow diagram of another illustrative process 800 for training a machine learning regression model, and modeling the training support for augmentation of the trained machine learning regression model. Portions of the process 800 will be described with further reference to the illustrative NN 100 shown in FIG. 1, and the data diagrams shown in FIGS. 3A and 3B.

The process 800 begins at block 802. The process 800 may begin in response to an event, such as when a machine learning model is to be trained. It will be appreciated that the process 800 may be performed by a single computing device or set of computing devices. For example, when the process 800 is initiated, a set of executable program instructions stored on one or more non-transitory computer-readable media (e.g., hard drive, flash memory, removable media, etc.) may be loaded into memory (e.g., random access memory or "RAM") of a computing system, such as the computing system 1200 shown in FIG. 12. The training support modeler instructions 1214 may be loaded into memory 1210 of the computing system 1200 and executed by one or more processors 1202. In some embodiments, the process 800 or portions thereof may be implemented on multiple processors 1202 and/or multiple computing systems 1200, serially or in parallel.

At block 804, the computing system 1200 can train a machine learning regression model, such as the NN 100, using training data 102. The NN 100 may be trained by generating output vectors 118 for the training data input vectors 120, determining the difference between the output vectors 118 and corresponding reference data output vectors 122, and then adjusting parameters of the NN 100 (e.g., weights and/or bias terms of the NN 100) such that the NN 100 will subsequently produce output vectors 118 that are closer to the corresponding reference data output vectors 122. In some embodiments, the training process and corresponding modification of parameter values may be performed as described above with respect to process 200 (e.g., using back propagation). The process of generating output vectors 118 from training data input vectors 120, determining the differences, and adjusting the parameters of the NN 100 may be repeated until one or more termination criteria are met. For example, the termination criteria can be based on the accuracy of the NN 100 as determined using a loss function, a number of iterations performed, a duration of time, or the like.

At block 806, the computing system 1200 can analyze training data input vectors 120 using the trained NN 100 to generate model evaluation output. The model evaluation output can then be analyzed to evaluate the performance of the NN 100 and model the training support in different regions of the feature space within which the NN 100 is configured and trained to operate. In some embodiments, the NN 100 may generate model evaluation output including feature vectors 114 and training data output vectors 118 from training data input vectors 120. Illustratively, training data input vectors 120 may include all training data input vectors 120 that were used to train and/or test the NN 100. The resulting feature vectors 114 and training data output vectors may be provided to the training support modeler 130 or some other module or component of the computing system 1200.

At block 808, the training support modeler 130 or some other module or component of the computing system 1200 may analyze the training data output vectors 118 with respect to the corresponding reference data output vectors 122. In contrast to the analysis that is performed during training (e.g., based on a value obtained by evaluating a loss function), the analysis may be performed to categorize the training data output vectors 118—and the feature vectors 114 from which they were generated—into various accuracy determination sets, also be referred to as accuracy categories. In some embodiments, the accuracy categories relate to the difference between the training data output vector 118 and corresponding reference data output vector 122 for each given feature vector 114. This difference may be referred to as "error." Illustratively, the error may be determined in terms of its magnitude (e.g., the absolute value of the difference between the values represented by the output vector 118 and reference data output vector 122) and/or its direction (e.g., whether the value represented by the output vector 118 is greater than or less than the value represented by the reference data output vector 122). Combining these two different aspects of the regression determinations yields various categories into which errors may be paced. For example, one category may be "small errors" in which the error magnitude is less than a threshold value, or in which the error is otherwise within a range of errors associated with the "small error" category. Another category may be "large positive errors" in which the error magnitude exceeds a threshold and the determined value represented by the training data output vector 118 is greater than the expected value representing by the reference data output vector 122. Another category may be "large negative errors" in which the error magnitude exceeds a threshold and the determined value represented by the training data output vector 118 is less than the expected value representing by the reference data output vector 122.

By way of example, a training data output vector 118 may include a regression output value of 123.7 for a particular training data input vector 120. The corresponding reference data output vector 118 may indicate that the expected value is 115.4. If the threshold for a small error is 10.0, then this example error may be categorized as a small error because the difference is –8.3 (115.4 is 8.3 less than the expected value of 123.7). If the threshold for a large negative error is 5.0, then this example error may be categorized as a large negative error.

In some embodiments, fewer, additional and/or alternative accuracy categories may be used, such as a one or more categories with magnitudes between the thresholds set for small and large errors, one or more categories with magnitudes that exceed thresholds significantly greater than those for the large positive and/or large negative errors, etc.

At block 810, the training support modeler 130 or some other module or component of the computing system 1200 may determine one or more distributions of feature data, as represented by feature vectors 114 generated from the training data input vectors 120. Each feature vector 114 may represent a point in the feature space within which the NN 100 is configured and trained to operate. Distributions of the feature data represented by the feature vectors 114 may therefore be distributions of such points within the relevant feature space. Because the distributions are determined from feature vectors 114 generated during training, the distributions represent the density of the features observed during training. Areas of greater density may thus represent areas in which more training data was observed than areas of lower density.

As discussed in greater detail below, regression output generated from subsequent feature vectors that fall within areas of higher density may be treated differently than regression output generated from subsequent feature vectors that fall within areas of lower density, depending upon the particular density being considered. For example, feature vectors associated with areas of higher density in a distribution of small errors may be considered to have more training-based support—and regression determinations based on these feature vectors may be considered more reliable—than feature vectors associated with areas of lower density in these distributions. In contrast, feature vectors associated with areas of higher density in a distribution of large positive errors or large negative errors may be considered to have less relevant training-based support—and regression determinations based on these feature vectors may be considered less reliable—than feature vectors associated with areas of lower density in these distributions. As another example, feature vectors associated with areas of high density in a distribution of all feature vectors considered during training may be considered to have more training-based support—and regression determinations based on these feature vectors may be considered more reliable—than feature vectors associated with areas of lower density in this distribution.

The distributions of feature vectors may be modeled using one or more of a variety of methods. In some embodiments, the distributions may be modeled using any of the methods described above with respect to process 200. For example, a separate GMM may be generated for each of the feature vector categories of interest for a particular application. Returning to the example above, there may be three GMMs: a first GMM of feature vectors 114 in the small errors category, a second GMM of feature vectors 114 in the large positive errors category, and/or a third GMM of feature vectors 114 in the large positive errors category. The likelihood that a given point represented by a single feature vector 114 is drawn from a data set modeled by a particular GMM therefore represents the likelihood that the point is associated with a small error, large positive error, or large negative error.

In some embodiments, a GMM may be generated for all feature vectors generated from the training data (e.g., regardless of whether the feature vectors are associated with a small error, large positive error, or large negative error). Thus, the GMM would represent the areas within the feature space where training has occurred, and the density of such training observations that were considered during training.

In some embodiments, the various distributions may be dynamically determined rather than pre-clustered according to rules. For example, the feature vectors and associated errors may be analyzed using an automated clustering algorithm. The number of clusters may be preconfigured or determined dynamically as part of algorithm execution. Illustratively, the clustering algorithm may be or include one or more of: library installation, clustering dataset, affinity propagation, agglomerative clustering, balanced iterative reducing and clustering using hierarchies ("BIRCH"), density-based special clustering of applications with noise ("DBSCAN"), k-means clustering, mini-batch k-means, mean shift, ordering points to identify the clustering structure ("OPTICS"), spectral clustering, and or GMM.

The example distribution modelling methods described herein are illustrative only, and are not intended to be exhaustive, required, or limiting. In some embodiments, additional and/or alternative distribution modeling methods may be used, individually or in combination, to model the feature space within which the machine learning model has been configured to operate and/or different categories of features observed during training of the machine learning model.

At block 812, the training support modeler 130 or some other module or component of the computing system 1200 may augment the NN 100 based on the distributions determined above. Augmentation using the distributions may include configuring the NN 100 to determine a confidence score or classification score based on the distributions. For example, if the feature vector 114 generated from a particular input vector is likely to be associated with a large positive error or large negative error (or is otherwise associated with otherwise inadequate training-based support), then the regression output may be augmented with a score that reflects this uncertainty. Augmentation using the distributions may include configuring the NN 100—or a component (e.g., computing device or subsystem) that uses the NN 100—to generate a separate training-based support metric that indicates the training basis for the regression determination made by the NN 100. The training-based support metric may be determined using one or more of the distributions described herein. For example, the training-based support metric may be a discrete value, such as a binary value, indicating adequate or inadequate training-based support. As another example, the training-based support metric may be a continuous value, such as a value within the range [0.0, 1.0], indicating a degree to which there is training-based support for the regression determination. The process 800 may terminate at block 814

Some example augmentation methods are described in greater detail below. However, the example augmentation methods described herein are illustrative only, and are not intended to be exhaustive, required, or limiting. In some embodiments, additional and/or alternative augmentation methods may be used, individually or in combination.

Although some examples described herein may be understood in terms of two-dimensional linear regression (e.g., where the input corresponds to an independent variable x, and the output predicted by the regression model corresponds to a dependent variable y), the examples are illustrative only and are not limiting. The systems and methods may be applied to n-dimensional regression, where n is not limited to two dimensions or states but may be any number greater than one. In some embodiments, a NN 100 may be trained to model a regression in terms of three or more dimensions, in which a set of various dimensions (x, y, z . . . ) corresponds to any number of parameters (time, temperature, speed, position . . . ). In such cases, the errors or other features, mixture ratios, clusters, or regions of interest that are identified and analyzed to determine distributions of corresponding feature space points may not necessarily be "positive" or "negative" errors in terms of an amount above or below a point on a regression line. Generally described, the regression errors that are determined may be defined by virtue of a magnitude of the error with respect to the regression (e.g., a distance from the nearest point on a regression line for a two-dimensional regression, a distance from the nearest point on a regression plane for a three-dimensional regression, etc.), and/or a vector describing the direction/orientation of the error with respect to the nearest point of the regression or other region or feature of interest. Illustratively, the errors may be described using principal components and principal vectors, eigenvalues and eigenvectors, singular value decomposition, or the like. In one embodiment, each error may be described in terms of an eigenvalue that is representative of a magnitude of the error with respect to the n-dimensional regression modeled by the NN 100, and an eigenvector that corresponds to a principal axis of the error with respect to the n-dimensional regression modeled by the NN 100. The distributions of feature space points may thus be determined as clusters of feature space points that are associated with errors of a similar magnitude and orientation as described by the eigenvalues and eigenvectors: some feature space points may be associated with eigenvalues in a particular range or exceeding a particular threshold, and may be associated with eigenvectors that are in a particular direction or range of directions from the regression, while other feature space points may be associated with errors having a different combination of eigenvalues and eigenvectors, etc.

Examples of Generating Augmented Regression Output

Figure 9:
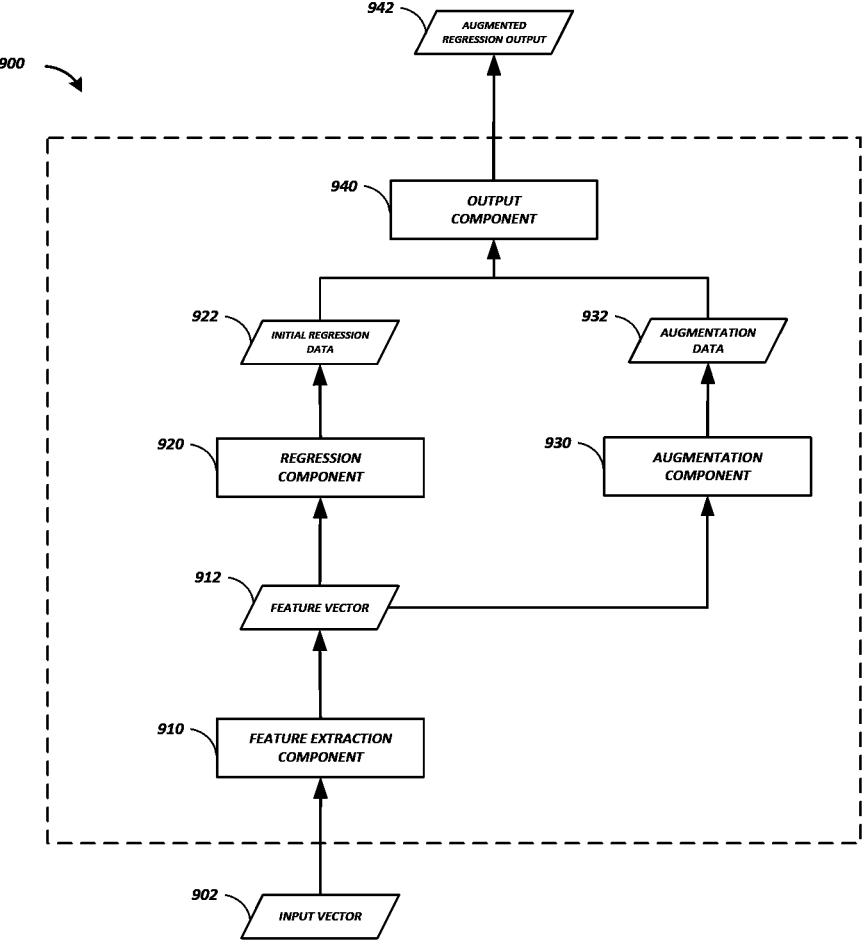
FIG. 9 is a diagram of an illustrative artificial neural network with a training support regression component according to some embodiments.

FIG. 9 is a diagram of an illustrative machine learning regression model 900 (also referred to simply as a "model" in the description which follows for convenience) configured to generate augmented regression output according to some embodiments. As shown, the model 900 includes a feature extraction component 910, a regression component 920, an augmentation component 930, and an output component 940. The model 900 is used to analyze an input, such as an input vector 902. During the course of analyzing the input vector 902, the feature extraction component 910 processes the input vector 902 and generates a feature vector 912 that represents a point of the feature space in which the model 900 is configured and trained to operate. The feature vector 912 may be used by the regression component 920 to generate initial regression data 922, and by the augmentation component 930 to generate augmentation data 932. The output component 940 may then generate augmented regression output 942 using the initial regression data 922 and augmentation data 932.

FIG. 10 is a flow diagram of an illustrative process 1000 that may be performed using the model 900 shown in FIG. 9 to generate augmented regression output 942. The process 1000 begins at block 1002. It will be appreciated that the process 1000 may be performed by a single computing device or set of computing devices. For example, when the process 1000 is initiated, a set of executable program instructions stored on one or more non-transitory computer-readable media (e.g., hard drive, flash memory, removable media, etc.) may be loaded into memory (e.g., random access memory or "RAM") of a computing system, such as the computing system 1200 shown in FIG. 12. The augmented machine learning model application instructions 1216 may be loaded into memory 1210 of the computing system 1200 and executed by one or more processors 1202. In some embodiments, the process 1000 or portions thereof may be implemented on multiple processors 1202 and/or multiple computing systems 1200, serially or in parallel.

At block 1004, the computing system 1200 can obtain an input vector 902. The input vector 902 may be an n-dimensional vector of data to be evaluated by the model 900 to produce regression output.

At block 1006, the computing system 1200 can generate a feature vector 912 from the input vector 902 using the feature extraction component 910. In some embodiments, the feature extraction component 910 may include portions of a neural network, such as the input layer and one or more internal layers. The output of one or more of the internal layers may be the feature vector 912. For example, the feature vector 912 may include output of the last internal layer, the second-to-last internal layer, or a combination of data from multiple internal layers.

At block 1008, the computing system 1200 can generate initial regression data 922 from the feature vector 912. In some embodiments, the initial regression data 922 generated from the current feature vector 912 may be an initial regression score denoted S(x), where x is the current feature vector 912. Illustratively, S(x) may be a score in a domain of continuous values between two endpoints, where one endpoint indicates the highest regression score that the model 900 is configured to produce, and where another endpoint indicates the lowest regression score that the model is configured to produce. For example, the initial regression score may be a floating-point value.

At block 1010, the computing system 1200 can generate augmentation data 932 from the feature vector 912. In some embodiments, the augmentation component 930 may generate augmentation data 932 as a training-based support metric that indicates the degree to which the current point in the feature space, represented by the current feature vector 912, is supported by the training process. For example, the training-based support metric may indicate the density of feature space points in the training data set that are in the same area as the feature space point represented by the current feature vector 912. The density may be a density of all feature space points observed during training, or an accuracy-based density such as the density of small errors, large negative errors, and/or large positive errors. As another example, the augmentation component 930 may be a classifier trained to classify points in the feature space as anomalous or not anomalous (e.g., the augmentation component 930 may be an "anomaly detector"). The degree to which a particular point in the feature space is anomalous may be due to the feature data being associated with a relatively large number of large positive errors or large negative errors in training data set, due to the feature data being associated with a relatively small quantity of similar training data inputs, or some other indicia of anomaly in the data. In this example, the augmentation component 930 may be a classifier that is trained using the feature vectors generated during training and their overall distribution and/or corresponding categorizations of small errors, large positive errors, and/or large negative errors.

The augmentation data 932 generated for the current vector 912 may be denoted A(x). The example that follows assumes that A(x) is determined using x, which is a point in the feature space represented by the current feature vector 912. However, in some embodiments the augmentation data 932 may be A(y) and computed using a different point, such as a point y in the input space represented by the current input vector 902, or some other point derived therefrom.

In one specific, non-limiting embodiment, the augmentation data 932 may be one of a set of discrete support values, where each value indicates a corresponding training-support-based classification of the set of possible training-support-based classifications (e.g., small errors, large negative errors, large positive errors, and/or lack of a threshold amount of training support). For example, a support value of −1 may indicate that the current feature vector 912 (or input vector 902) is most likely associated with a large negative error, a support value of 0 may indicate that the current feature vector 912 (or input vector 9020 is most likely associated with a small error, and a support value of 1 may indicate that the current feature vector 912 (or input vector 902) is most likely associated with a large positive error.

In another specific, non-limiting embodiment, the augmentation data 932 may be a score indicating the confidence or expected error associated with the current feature vector 912 (or input vector 902). If the feature space regions associated with each of the possible training-support-based classifications are modeled using mixture density functions (e.g., GMMs), then the average error in the each of the densities in the mixtures can be used. For example, there may be are $n_1$ densities in the mixture for case 1 (e.g., for small errors), $n_2$ for case 2 (e.g., large positive errors), and $n_3$ for case 3 (e.g., large negative errors), and each density may have an average error in its feature space region. An input-dependent confidence value can be obtained using those averages. Illustratively, the density in which the current feature vector is mostly likely grouped may be identified, and the average error for that density may be evaluated and used as an expected error or to derive a confidence score.

In another specific, non-limiting embodiment, the augmentation data 932 may be a multi-dimensional confidence vector. One element may indicate the degree to which there is training-based support for the current regression determination. For example, this element may be determined using a distribution of feature space points observed during training. If the current feature vector 912 is associated with a sufficient density of training feature space points, such as an amount that satisfies a threshold or some other criterion, then the training-based support element may be assigned a higher value than if the current feature vector 912 was associated with an insufficient density of training feature space points. Another element of the multi-element vector may indicate the expected performance of the regression model for the current feature vector 912 (or input vector 902). For example, this element may be determined using the distributions of small errors, large positive errors, and/or large negative errors: if the current feature vector 912 is associated with the small error distribution, the expected performance element may indicate a small expected degree of error; if the current feature vector 912 is associated with the large positive error distribution, the expected performance element may indicate a large expected degree of error in the positive direction; or if the current feature vector 912 is associated with the large negative error distribution, the expected performance element may indicate a large expected degree of error in the negative direction. Determinations of expected performance with respect to these distributions may be more important when there is sufficient training-based support, as indicated by the first element of the confidence vector.

At block 1012, the computing system 1200 can generate augmented regression output 942 using the initial regression data 922 and augmentation data 932. In some embodiments, the output component 940 may generate a multi-dimensional augmented regression output 942 that includes both the augmentation data A(x) and the regression score S(x), or values derived therefrom. In this way, consumers of the augmented regression output 942 can apply their own processing to account for different degrees of training-based support fort the regression score. The process 1000 may terminate at block 1014.

Additional Embodiments

In some embodiments, a Bayesian classifier, such as that implemented by the augmented classification component 620 described above, may further augment classification determinations or the classification output using a training support metric that represents the degree to which the training data upon which the classifier was trained is similar to—or otherwise supports classification determinations based on—the current feature vector. The training support metric may be used in one or more ways, such as: as another feature upon which the Bayesian classifier determines the probability of a positive or negative classification; as a weighting factor used to adjust the output of the Bayesian classifier; as another output value that is produced in addition to the output of the Bayesian classifier; or a combination thereof. The training support classification metric may be based on a distribution of the feature space points observed during training, such as those represented by the feature vectors generated from input vectors. For example, the feature space points may be determined by a layer of neurons of a neural network. The particular layer may be the last hidden layer before the output layer, a second-to-last hidden layer or some prior layer. In some embodiments, the feature space points modeled by the distribution may come from a combination of outputs from layers of a neural network.

In some embodiments, a training support metric may be based on a training support classifier trained to classify points in the feature space as anomalous or not anomalous (e.g., the training support classifier may be an "anomaly detector").

In some embodiments, a training support metric may be based on the distributions of training points associated with TPs, TNs, FPs, and FNs observed training. A computing system can evaluate a current feature vector using the mixture densities representing these distributions. The mixture density function outputs can be multiplied by number of TPs, TNs, FPs, and FNs, respectively, in the data sets upon which the distributions were determined. The resulting value is the product of the number of points in the data set multiplied by the density of the data set. This value can be then compared against a training support threshold to determine whether classification determinations made on feature space points in this area of the feature space are supported by training experience, with the result being a discrete (binary) value. Feature space points that are well supported by accurate training experience (whether resulting in TPs or TNs) and produce the same classification output as that well-supported training experience (P or N, respectively) may be considered to be reliably accurate. Feature space points that are well supported by inaccurate training experience (whether resulting in FPs or FNs) and produce the same classification output as that well-supported training experience (P or N, respectively) may be considered to be reliably inaccurate. Feature space points that are inadequately supported by accurate training experience and produce the same classification output as that inadequately-supported training experience may be considered to be unreliable.

In some embodiments, a training support metric determined using a product of a mixture density function and a number of corresponding outcomes can be evaluated by a non-linearity, such as a layer of a neural network, to produce a value within a continuous range (such as [0.0, 1.0]) that represents the degree to which the feature space point is or is not supported by the training data.

In some embodiments, the particular distributions modeled by the mixture density functions may be based on subsets of all training data that would otherwise be included in the respective data sets. Rather than using a data set of all TP, TN, FP, and/or FN classifications and associated feature space points, a subset thereof may be selected based on one or more attributes. The attributes may be attributes of the input vectors from which the feature vectors and classification determinations are based, such as particular values of particular elements of the vectors. For example, an input vector may represent an item or event with a number of different properties. The data set of all TPs, TNs, FPs, and/or FNs, as needed, may be separated into subsets with particular values for a particular property. Alternatively, or in addition, the attributes may be attributes of sources of the input vectors. For example, an input vector may represent an item or event associated with a particular source, even if the source is not referenced byte input vector. The input vector may be associated with metadata describing different attributes, such as source identity, geographic associations, demographic data, timestamps, and the like. The data set of all TPs, TNs, FPs, and/or FNs, as needed, may be separated into subsets of input vectors associated with different sources or source attributes. In this way, the distributions of the subsets modeled by the mixture density functions may be more granular and customizable. For example, when a system is generating classification output associated with a particular source of input vector data, the system can determine one or more attributes of the particular source (e.g., by analyzing metadata associated with the input vector data or particular source thereof, or by receiving an identifier of the one or more attributes). The system can then determine the training support classification model or mixture density functions of training data also associated with the particular source of input vector data, and use the model or functions as described above instead of (or in addition to) the training support classification model or mixture density functions of all training data upon which the model was trained. This may provide different and more accurate results than using attributes of the input source as an input value or feature of a globally-applicable augmented classification model.

In some embodiments, a metric that represents the distance of a given point x in the feature space from the center of a cluster of feature space points may be used as another feature input. For example, the distance metric may be used as a feature input to a Bayesian classifier instead of, or in addition to, other mixture-density-based probabilities such as those described herein. As another example, the distance metric may be passed through a non-linearity, such as a layer of a neural network, and then used to determine a classification or regression output. The distance metric may be useful to indicate inclusion or exclusion of a point in a particular cluster of data points within the feature space, such as a cluster of TPs, TNs, FPs, FNs, small errors, large negative errors, large positive errors, or training data points of all kinds. In some embodiments, the distance metric may be a Gaussian kernel (also referred to as a Gaussian similarity). A Gaussian kernel may be implemented as the distance of a particular data point x (e.g., the data point represented by the feature vector) from the center of a particular cluster. The center of the particular cluster may be indicated by the mean of the Gaussian that models the cluster. The difference between the point and the mean may be divided by the standard deviation of the Gaussian that models the cluster. In this way, depending upon which direction the point offset from the mean in the feature space, the distance is adjusted depending upon the standard deviation of the Gaussian in that direction.

Operating Environment

Figure 11:
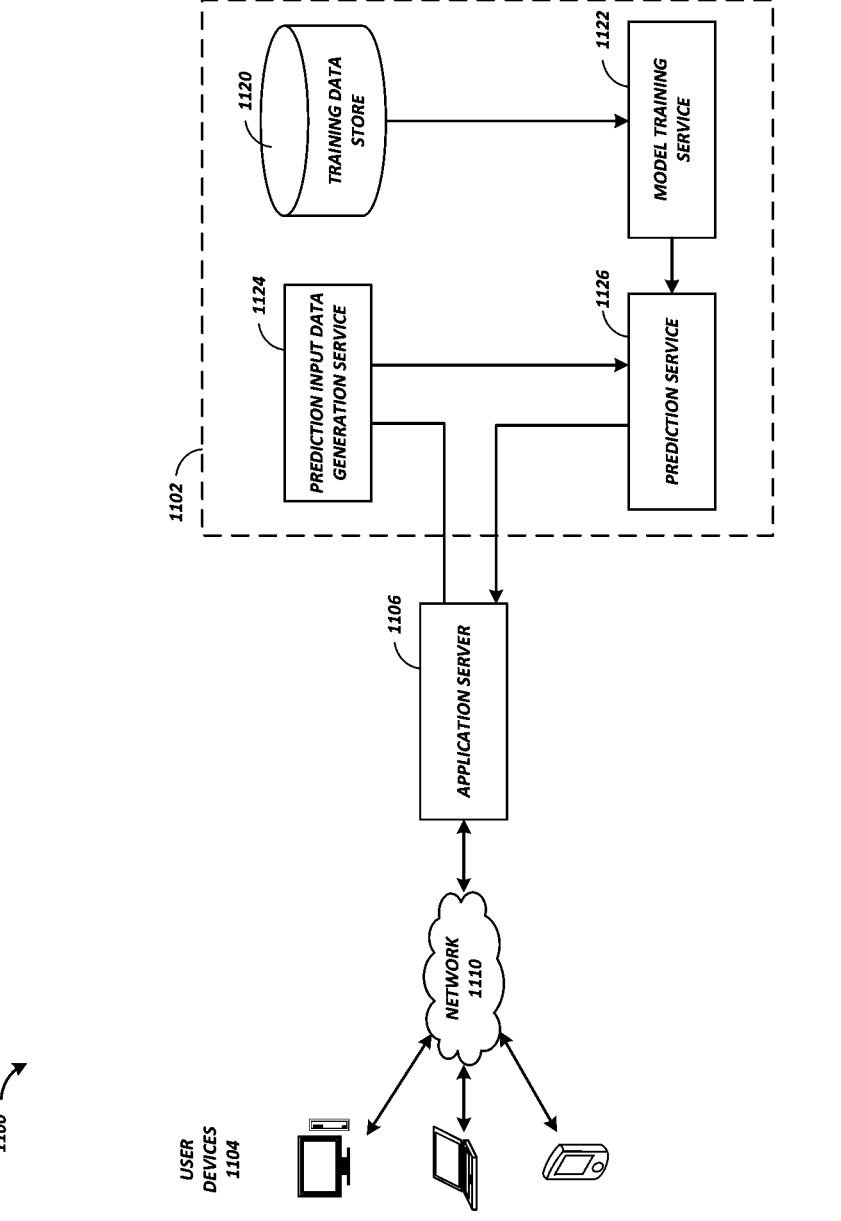
FIG. 11 is a diagram of an illustrative system configured to use a training-support-based augmented machine learning classifier according to some embodiments.

FIG. 11 is a block diagram depicting an illustrative operating environment 1100 used in some embodiments for generating and using a training-support-based augmented machine learning model. The illustrative operating environment 1100 shown in FIG. 11 includes an analysis system 1102 that enables users to analyze and classify data or generate regression output based on data, such as medical data (e.g., scan or imaging data, diagnostic data, electronic health record data, etc.), imaging data (e.g., videos, images, or sensor output, such as from a surveillance device, robotic device, autonomous vehicle, etc.), security data (e.g., individual risk factors, surveillance video, etc.), consumer data (e.g., event history, financial data, etc.), route planning (e.g., turn-by-turn directions), operational data (e.g., supply chain management and optimization), or other data. Illustratively, the data to be analyzed may be provided from user devices 1104 through a communication network 1110.

In one specific non-limiting embodiment, the system 1102 may analyze medical data to determine a diagnosis classification for a particular sample or patient. A machine learning classification model may produce a classification with a high degree of confidence, such as the sample or patient having cancer to a high degree of confidence or not having cancer to a high degree of confidence. However, if the feature space point (or points) associated with the sample or patient is in a region of the feature space in which a significant portion of determinations made during training were not accurate (e.g., many false positives and/or false negatives), or in a region of the feature space in which an inadequate amount of training data was observed, then the high-confidence classification may be unreliable. For example, a particular patient may have associated factors that were not seen (or only rarely seen) together during training, and therefore the model output does not have an adequate basis for making a diagnosis. By providing an augmented machine learning model that considers the training support for classification determinations, the unreliable nature of otherwise high-confidence classifications can be provided to a user, the degree of confidence can be reduced, or other steps can be taken.

In another specific non-limiting embodiment, the system 1102 may analyze patient medical data, such as data from scans, tests, patient history, and the like, and make predictions regarding a spread of infection, cancer, or other illness. A machine learning regression model may generate a predicted timeframe or rate of spread. However, if the feature space point (or points) associated with the sample or patient is in a region of the feature space in which a significant portion of determinations made during training were not accurate (e.g., many large negative errors or large positive errors), or in a region of the feature space in which an inadequate amount of training data was observed, then the regression output may be unreliable. For example, a particular scan or test may have associated factors that were not seen (or only rarely seen) together during training, and therefore the model output does not have an adequate basis for making a prediction. By providing an augmented machine learning model that considers the training support for regression determinations, the unreliable nature of the predictions or other regression output can be provided to a user, the degree of confidence can be reduced, or other steps can be taken.

In another specific non-limiting embodiment, the system 1102 may analyze digital content, such as audio and/or video, and determine whether the content includes unauthorized content. A machine learning model may generate output indicating whether a digital content item includes such unauthorized content. However, if the feature space point (or points) associated with the input is in a region of the feature space in which a significant portion of determinations made during training were not accurate (e.g., many false positives or false negatives for a classification model, or many large negative errors or large positive errors for a regression model), or in a region of the feature space in which an inadequate amount of training data was observed, then the output may be unreliable. For example, a particular digital content item may include fair use commentary on a particular work, such that the digital content item does not actually include unauthorized content. By providing an augmented machine learning model that considers the training support for classification or regression determinations, the unreliable nature of the predictions, classifications, or other model output can be provided to a user, the degree of confidence can be reduced, or other steps can be taken.

In another specific non-limiting embodiment, the system 1102 may analyze profile and/or action data to determine a degree of risk posed by a particular individual. A machine learning model may produce a classification with a high degree of confidence, such as the individual being a security risk or a loan default risk with a high degree of confidence. However, if the feature space point (or points) associated with the individual is in a region of the feature space in which a significant portion of determinations made during training were not accurate (e.g., many false positives and/or false negatives), or in a region of the feature space in which an inadequate amount of training data was observed, then the high-confidence classification may be unreliable. By providing an augmented machine learning model that considers the training support for classification determinations, the unreliable nature of otherwise high-confidence classifications can be provided to a user, the degree of confidence can be reduced, or other steps can be taken.

In another specific non-limiting embodiment, the system 1102 may analyze route data to determine a route, such as for automobile navigation. A machine learning regression model that suggests optimal routes and arrival times may be trained on historical traffic data, including anomalous events. The model may produce output indicating that a particular route is optimal, or the model may produce output regarding a particular metric of a route (e.g., expected travel time). However, if a route or metric is generated based on an anomalous event that was rarely—if ever—encountered during training or for which training tended to produce large errors (e.g., a water main breaks and a power outage effects traffic lights in an area), the model can produce augmented regression output indicating such a lack of training-based support. The augmented regression output may include a confidence metric based on the degree of training data support, such as the amount of training data associated with the same or similar features as the current input, the error magnitude and direction of regression output generated from the same or similar features, etc. For example, when presented with anomalous input data such as the water main break and power outage described above, the model may produce augmented output indicating an exceptionally short travel time for a particular route, but a very low confidence in the travel time. In some cases, the model may produce different output altogether, such as by weighting potential routes in a way that causes selection of a different suggested route altogether. For example, a training metric may be used as a weighting factor such that some routes or portions thereof have a lower chance of being selected if they are associated with a lower confidence, while other routes or portions thereof have a higher chance of being selected based on a higher confidence. This may result in higher-confidence routes being selected even if they have other less desirable metrics (e.g., estimated travel times) than lower-confidence routes.

In another specific non-limiting embodiment, the system 1102 may analyze logistics and supply chain data to generate data regarding optimizations that may be implemented. A machine learning regression model that suggests optimization of logistics and supply chains may be impacted by untrained conditions or regions within the training feature space, or conditions or regions that are otherwise associated with large negative or positive errors. For example, many supply chains are constrained by a set of known limiting agents, such as a particularly slow manufacturing process/facility, a time-intensive transportation stage, etc. A model trained to generate optimization data intended to ensure stock is available "just in time" may be trained to rely heavily on data regarding these limiting agents due to their significant impact on historical training. In some cases, even training data that includes anomalies in the supply chain might only address unique events that effect a small portion of a supply chain, and/or events that are otherwise not represented in sufficient numbers to produce a reliable regression for feature space regions associated with inputs representing similar conditions. For example, a manufacturer may produce products at a slow nominal rate per unit, and a model may be trained on data where this manufacturer is a consistent limiting agent with few training instances to the contrary. However, a worldwide event with novel impacts across all branches of a supply chain could result in model inputs known to produce unreliable results, or at least not known to produce reliable results. In this example, if delivery of materials that the manufacturer takes as inputs has slowed in a way never seen in the training data, or has slowed in a way seen infrequently enough to be poorly trained, the model's predicted delivery speed may indicate a false nominal time. Such an inaccurate predication may have widespread consequences to downstream agents in a supply chain. The system 1102 can use a model that produces augmented regression output, and can therefore identify inputs that are outside the model's training data or are associated with large errors. The augmented regression output generated by the system 1102 may be generated to include a training-support-based confidence metric that may serve as a warning that the output is unreliable.

Aspects of the present disclosure are applicable to a large number of other environments where other types of predictions or other determinations may be made using a machine learning model.

In some embodiments, as depicted in FIG. 11, the analysis service 1102 may implement a training data store 1120, a model training service 1122, a prediction input data generation service 1124, and a prediction service 1128. In some implementations, the data store 1120 and the services 1122, 1124, 1126 may be components of one computing system. In other embodiments, the analysis service 1102 may operate in a distributed computing environment including several computer systems that are interconnected using one or more computer networks. The analysis service 1102 could also operate within a computing environment having a fewer or greater number of devices or services than are illustrated in FIG. 11. Thus, the depiction of analysis service 1102 in FIG. 11 should be taken as illustrative and not limiting to the present disclosure. For example, the analysis service 1102 could implement various web services components and/or peer-to-peer network configurations to implement at least a portion of the processes described herein.

In some embodiments, the services provided by the analysis service 1102 may be implemented as one or more web services consumable via the network 1110. In further embodiments, the analysis service 1102 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, the analysis system 1102 may include or be in communication with an application server 1106 that receives data from user devices 1104, submits the data for analysis by the analysis system 1102, and provides results back to user devices 1104. The front-end communication provided by the application server 1106 may include generating text and/or graphics, possibly organized as a user interface using hypertext transfer or other protocols in response to information inquiries received from the various user devices 1104.

User computing devices 1104 may be any of a number of computing devices that are capable of communicating over a network including, but not limited to, a laptop, personal computer, personal digital assistant (PDA), hybrid PDA/mobile phone, mobile phone, smartphone, electronic book reader, digital media player, tablet computer, gaming console or controller, kiosk, augmented reality device, other wireless device, set-top or other television box, robotic device, autonomous vehicle, and the like.

A user computing device 1104 may communicate with the application server 1106 via the communication network 1110, such as the Internet or other communications link. The network 1110 may be any wired network, wireless network or combination thereof. In addition, the network 1110 may be a personal area network, local area network, wide area network, cable network, satellite network, cellular telephone network, etc., or combination thereof. For example, the network 1110 may be a publicly accessible network of linked networks, possibly operated by various distinct parties, such as the Internet. In some embodiments, the network 1110 may be a private or semi-private network, such as a corporate or university intranet. The network 1110 may include one or more wireless networks, such as a Global System for Mobile Communications (GSM) network, a Code Division Multiple Access (CDMA) network, a Long-Term Evolution (LTE) network, or some other type of wireless network. The network 1110 may use protocols and components for communicating via the Internet or any of the other aforementioned types of networks.

A training data store 1120 may be used to store training data. Training data may include data from which a machine learning model can be trained, and from which training-supported-based distributions, metrics, or the like may be generated. In some embodiments, the training data store 1120 may be local to the analysis system 1102, may be remote from the analysis system 1102, and/or may be a network-based service itself. The illustrated data store may be embodied in hard disk drives, solid state memories, any other type of non-transitory computer-readable storage medium, and/or a file, a database, a relational database, in-memory cache, and/or stored in any such non-transitory computer-readable medium. The data store 1120 may also be distributed or partitioned across multiple local and/or storage devices, or combined into a single storage device, without departing from the spirit and scope of the present disclosure.

The training data store 1120 may provide a model training service 1122 with training data, which the model training service 1122 may use to learn a machine learning model. For example, the model training service 1122 may generate and train a neural network to classify data from the training data store 1120. The model training service 1122 may also generate distributions of training data or other training-data-based analysis components, and use the distributions or other components to generate a training-support-based augmented machine learning model, as described herein. The model training service 1122 may provide the training-support-based augmented machine learning model to a prediction service 1126.

In some embodiments, a user device 1104 may provide data to the analysis system 1102 to be analyzed using the augmented machine learning model. The prediction input data generation service 1124 may process data into one or more input vectors. The prediction service 1126 may determine a classification or regression output for the input vectors using the training-support-based augmented machine learning model.

Computing System

Figure 12:
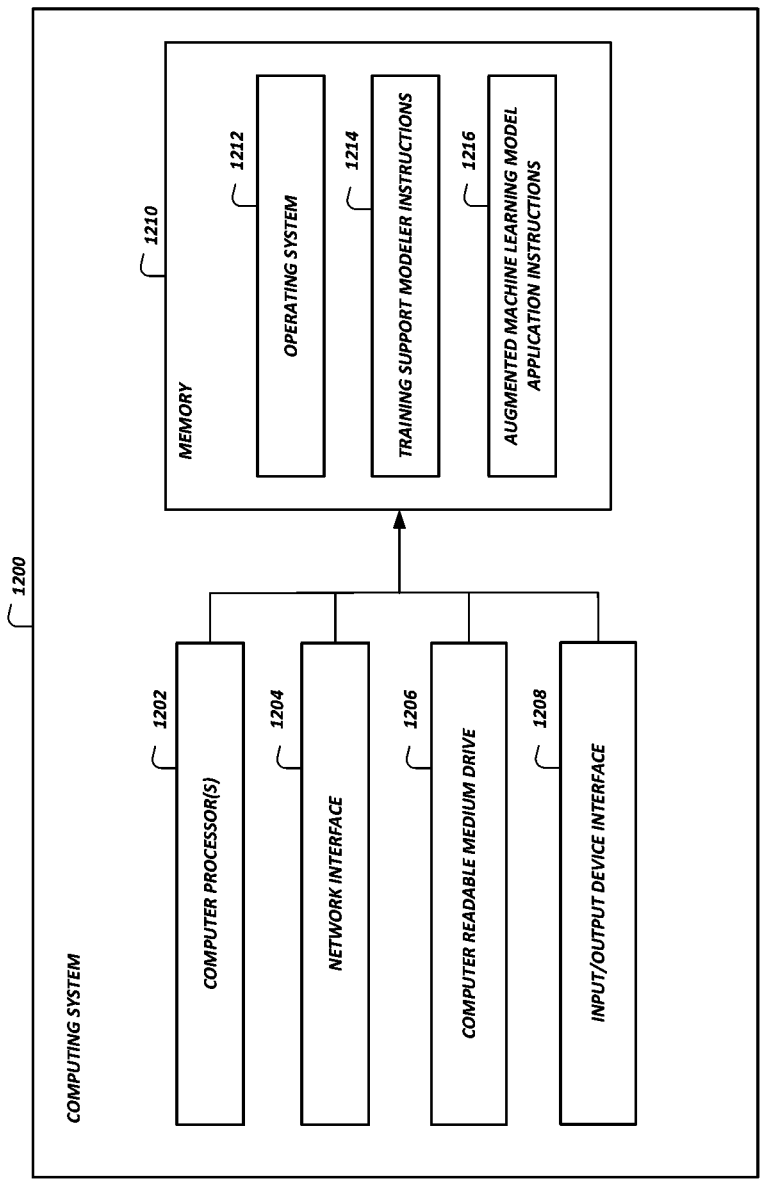
FIG. 12 is a block diagram of an illustrative computing system configured to implement training and use of training-supported-based augmented machine learning models according to some embodiments.

FIG. 12 illustrates an example computing system 1200 that may be used in some embodiments to execute the processes and implement the features described above. In some embodiments, the computing system 1200 may include: one or more computer processors 1202, such as physical central processing units ("CPUs") or graphics processing units ("GPUs"); one or more network interfaces 1204, such as a network interface cards ("NICs"); one or more computer readable medium drives 1206, such as high density disks ("HDDs"), solid state drives ("SDDs"), flash drives, and/or other persistent non-transitory computer-readable media; an input/output device interface 1208, such as an IO interface in communication with one or more microphones; and one or more computer readable memories 1210, such as random access memory ("RAM") and/or other volatile non-transitory computer-readable media.

The network interface 1204 can provide connectivity to one or more networks or computing systems. The computer processor 1202 can receive information and instructions from other computing systems or services via the network interface 1204. The network interface 1204 can also store data directly to the computer-readable memory 1210. The computer processor 1202 can communicate to and from the computer-readable memory 1210, execute instructions and process data in the computer readable memory 1210, etc.

The computer readable memory 1210 may include computer program instructions that the computer processor 1202 executes in order to implement one or more embodiments. The computer readable memory 1210 can store an operating system 1212 that provides computer program instructions for use by the computer processor 1202 in the general administration and operation of the computing system 1200. The computer readable memory 1210 can also include training support modeler instructions 1214 for implementing training of machine learning models, modeling of training-based support for the models, and the like. The computer readable memory 1210 can also include augmented machine learning model application instructions 1216 for implementing use of augmented machine learning models. The computer readable memory 1210 can further include computer program instructions and other information for implementing aspects of the present disclosure.

Some inventive aspects of the disclosure are set forth in the following clauses:

Clause 1: A system comprising:

computer-readable memory storing executable instructions; and one or more processors programmed by the executable instructions to at least:

obtain a corpus of training data comprising a plurality of training data input vectors and a plurality of reference data output vectors, wherein a reference data output vector of the plurality of reference data output vectors represents a desired output generated by an artificial neural network from a corresponding training data input vector of the plurality of training data input vectors;

train the artificial neural network using the corpus of training data to generate classification determinations;

generate, using the artificial neural network and the plurality of training data input vectors:

a plurality of feature vectors, wherein a feature vector of the plurality of feature vectors represents a point in a feature space from which the artificial neural network has been trained to make classification determinations; and a plurality of training data output vectors, wherein a training data output vector of the plurality of training data output vectors represents a classification determination based on a corresponding feature vector of the plurality of feature vectors;

determine, based on an analysis of the plurality of training data output vectors with respect to the plurality of reference data output vectors:

a first distribution of feature vectors corresponding to training data output vectors representing true positive classification determinations;

a second distribution of feature vectors corresponding to training data output vectors representing true negative classification determinations;

a third distribution of feature vectors corresponding to training data output vectors representing false positive classification determinations;

a fourth distribution of feature vectors corresponding to training data output vectors representing false negative classification determinations; and a fifth distribution of feature vectors corresponding to the plurality of training data output vectors; and configure the artificial neural network to generate augmented classification output based at least partly on the first distribution of feature vectors, the second distribution of feature vectors, the third distribution of feature vectors, the fourth distribution of feature vectors, and the fifth distribution of feature vectors.

Clause 2: The system of clause 1, wherein to generate the plurality of feature vectors, the one or more processors are programmed by the executable instructions to:

receive a first training data input vector of the plurality of training data input vectors at an input layer of the artificial neural network;

apply a set of weights to the first training data input vector, wherein the set of weights is associated with the input layer and a first hidden layer of the artificial neural network; and generate a first feature vector as output of a set of hidden layers of the artificial neural network, the set of hidden layers comprising the first hidden layer.

Clause 3: The system of clause 1, wherein to determine at least one of the first distribution of feature vectors, the second distribution of feature vectors, the third distribution of feature vectors, the fourth distribution of feature vectors, or the fifth distribution of feature vectors, the one or more processors are programmed by the executable instructions to generate one of a Gaussian mixture model or a clustering model to represent feature vectors corresponding to training data output vectors.

Clause 4: The system of clause 1, wherein to configure the artificial neural network to generate augmented classification output, the one or more processors are programmed by the executable instructions to generate an augmented classification output component configured to generate classification augmentation data based on at least on one of: the first distribution of feature vectors, the second distribution of feature vectors, the third distribution of feature vectors, the fourth distribution of feature vectors, or the fifth distribution of feature vectors.

Clause 5: The system of clause 4, wherein the classification augmentation data comprises at least one of: a weighting factor to be applied to a classification score, or a training support metric to be output separately from the classification score.

Clause 6: A computer-implemented method comprising:

under control of a computing system comprising one or more processors configured to execute specific instructions, obtaining a trained machine learning model and a corpus of training data used to train the trained machine learning model;

determining, using the trained machine learning model and the corpus of training data, a distribution of feature space points observed during training of the trained machine learning model, wherein data generated from a training input item of the corpus of training data represents a feature space point of the feature space points observed during training of the trained machine learning model, and wherein the feature space point is included in the distribution of feature space points based on the feature space point being associated with one of: a false positive classification determination, a false negative classification determination, a true positive classification determination, a true negative classification, or the feature space points observed during training; and generating a classifier that generates augmented classification output based at least partly on output of the trained machine learning model and the distribution of feature space points.

Clause 7: The computer-implemented method of clause 6, further comprising generating the augmented classification output using the classifier and an input vector, wherein the augmented classification output comprises:

a classification score representing a classification of the input vector; and a training-support-based metric representing a degree to which the corpus of training data supports the classification of the input vector.

Clause 8: The computer-implemented method of clause 7, further comprising generating the training-support-based metric using an anomaly detector and the input vector, wherein the anomaly detector determines a degree to which the input vector is anomalous with respect to input vectors in the corpus of training data.

Clause 9: The computer-implemented method of clause 7, further comprising generating the training-support-based metric based on the distribution of feature space points and a quantity of feature space points in the distribution of feature space points.

Clause 10: The computer-implemented method of clause 6, further comprising generating the augmented classification output using the classifier and an input vector, wherein the augmented classification output comprises a weighted classification score representing an augmented classification of the input vector, and wherein the weighted classification score is weighted based on a degree to which the corpus of training data supports an initial classification of the input vector.

Clause 11: The computer-implemented method of clause 10, further comprising generating a weighting factor using an anomaly detector and the input vector, wherein the anomaly detector determines a degree to which the input vector is anomalous with respect to input vectors in the corpus of training data.

Clause 12: The computer-implemented method of clause 10, further comprising generating a weighting factor using an anomaly detector and the input vector, wherein the anomaly detector determines a degree to which the input vector is associated with anomalous classification determinations observed during training of the trained machine learning model using the corpus of training data.

Clause 13: The computer-implemented method of clause 10, further comprising:

expanding a range of an initial classification score representing the initial classification of the input vector prior to applying a weighting factor to the initial classification score; and compressing a range of a weighted initial classification score subsequent to applying the weighing factor to the initial classification score.

Clause 14: The computer-implemented method of clause 6, wherein determining the distribution of feature space points comprises generating at least one of: a Gaussian mixture model to represent at least a subset of the feature space points, or a clustering model to represent at least a subset of the feature space points.

Clause 15: The computer-implemented method of clause 6, further comprising generating feature data representing a plurality of feature space points using the trained machine learning model and the corpus of training data, wherein determining the distribution of the feature space points comprises determining a distribution of at least a subset of the plurality of feature space points represented by the feature data.

Clause 16: The computer-implemented method of clause 15, wherein generating the feature data representing the plurality of feature space points comprises:

providing a first training data input item of the corpus of training data to an input layer of the trained machine learning model, wherein the trained machine learning model comprises a neural network;

applying a set of weights to the first training data input item, wherein the set of weights is associated with the input layer and a first hidden layer of the neural network; and generating a first feature vector as output of a set of hidden layers comprising the first hidden layer, wherein the first feature vector represents a first feature space point of the plurality of feature space points.

Clause 17: The computer-implemented method of clause 6, wherein generating the classifier comprises generating a Bayesian classifier that generates the augmented classification output using:

a feature vector generated by an internal layer of an artificial neural network; and a probability value determined using a model of the distribution of feature space points.

Clause 18: The computer-implemented method of clause 17, further comprising evaluating a Gaussian kernel using the feature vector and at least one model of a distribution of feature space points, wherein the Bayesian classifier generates the augmented classification output further using data regarding the Gaussian kernel.

Clause 19: A system comprising:

computer-readable memory storing executable instructions; and one or more processors programmed by the executable instructions to at least:

obtain a trained machine learning model and a corpus of training data used to train the trained machine learning model;

determine, using the trained machine learning model and the corpus of training data, a distribution of feature space points observed during training of the trained machine learning model, wherein data generated from a training input item of the corpus of training data represents a feature space point of the feature space points observed during training of the trained machine learning model, wherein a training output item represents a classification determination of the trained machine learning model based on the feature space point, and wherein the feature space point is included in the distribution based on at least one of: the training output item being associated with an accuracy determination set, or the feature space point being a member of the feature space points observed during training; and generate a classifier that generates augmented classification output based at least partly on output of the trained machine learning model and the distribution of feature space points.

Clause 20: The system of clause 19, wherein the accuracy determination set comprises feature space points corresponding to training output items associated with one of: true positive classification determinations; true negative classification determinations; false positive classification determinations; or false negative classification determinations.

Clause 21: A system comprising:

computer-readable memory storing executable instructions; and one or more processors programmed by the executable instructions to at least:

obtain a corpus of training data comprising a plurality of training data input vectors and a plurality of reference data output vectors, wherein a reference data output vector of the plurality of reference data output vectors represents a desired output generated by an artificial neural network from a corresponding training data input vector of the plurality of training data input vectors;

train the artificial neural network using the corpus of training data to generate regression output;

generate, using the artificial neural network and the plurality of training data input vectors:

a plurality of feature vectors, wherein a feature vector of the plurality of feature vectors represents a point in a feature space from which the artificial neural network has been trained to generate regression output; and a plurality of training data output vectors, wherein a training data output vector of the plurality of training data output vectors represents a regression output based on a corresponding feature vector;

determine, based on an analysis of the plurality of training data output vectors with respect to the plurality of reference data output vectors:

a first distribution of feature vectors corresponding to training data output vectors in a first subset of the training data output vectors, wherein each training data output vector in the first subset is associated with an error value that is less than a large error threshold;

a second distribution of feature vectors corresponding to training data output vectors in a second subset of the training data output vectors, wherein each training data output vector in the second subset is associated with a positive error value having a magnitude greater than the large error threshold;

a third distribution of feature vectors corresponding to training data output vectors in a third subset of the training data output vectors, wherein each training data output vector in the third subset is associated with a negative error value having a magnitude greater than the large error threshold; and a fourth distribution of the plurality of feature vectors; and configure the artificial neural network to generate augmented regression output based at least partly on the first distribution of feature vectors, the second distribution of feature vectors, the third distribution of feature vectors, and the fourth distribution of feature vectors.

Clause 22: The system of clause 21, wherein to generate the plurality of feature vectors, the one or more processors are programmed by the executable instructions to:

receive a first training data input vector of the plurality of training data input vectors at an input layer of the artificial neural network;

apply a set of weights to the first training data input vector, wherein the set of weights is associated with the input layer and a first hidden layer of the artificial neural network; and generate a first feature vector as output of a set of hidden layers of the artificial neural network, the set of hidden layers comprising the first hidden layer.

Clause 23: The system of clause 21, wherein to determine at least one of the first distribution of feature vectors, the second distribution of feature vectors, the third distribution of feature vectors, or the fourth distribution of feature vectors, the one or more processors are programmed by the executable instructions to generate one of a Gaussian mixture model or a clustering model to represent feature vectors corresponding to training data output vectors.

Clause 24: The system of clause 21, wherein to configure the artificial neural network to generate augmented regression output, the one or more processors are programmed by the executable instructions to generate an augmented regression output component configured to generate regression augmentation data based on at least on one of: the first distribution of feature vectors, the second distribution of feature vectors, the third distribution of feature vectors, or the fourth distribution of feature vectors.

Clause 25: The system of clause 24, wherein the regression augmentation data comprises at least one of: a first value representing a degree of training data support, or a second value representing an expected degree of error.

Clause 26: A computer-implemented method comprising:

under control of a computing system comprising one or more processors configured to execute specific instructions, obtaining a trained machine learning model and a corpus of training data used to train the trained machine learning model;

determining, using the trained machine learning model and the corpus of training data, a distribution of feature space points observed during training of the trained machine learning model, wherein data generated from a training input item of the corpus of training data represents a feature space point of the feature space points observed during training of the trained machine learning model, and wherein the feature space point is included in the distribution of feature space points based on the feature space point being associated with one of: an error value having a magnitude that is less than a threshold, a positive error value having a magnitude greater than the threshold, or a negative error value having a magnitude greater than the threshold; and configuring a regression subsystem to generate augmented regression output based at least partly on output of the trained machine learning model and the distribution of feature space points.

Clause 27: The computer-implemented method of clause 26, further comprising generating the augmented regression output using the regression subsystem and an input vector, wherein the augmented regression output comprises:

a regression score based on the trained machine learning model and the input vector; and a training-support-based metric representing a degree to which the corpus of training data supports the regression score.

Clause 28: The computer-implemented method of clause 27, further comprising generating the training-support-based metric using an anomaly detector and the input vector, wherein the anomaly detector determines a degree to which the input vector is anomalous with respect to input vectors in the corpus of training data.

Clause 29: The computer-implemented method of clause 27, further comprising determining the training-support-based metric based on a support value associated with the distribution of feature space points, wherein the distribution of feature space points is one of a plurality of distributions of feature space points, and wherein each of the plurality of distributions of feature space points is associated with a different support value.

Clause 30: The computer-implemented method of clause 26, further comprising generating the augmented regression output using the regression subsystem and an input vector, wherein the augmented regression output comprises a weighted regression score weighted based on a degree to which the corpus of training data supports an initial regression score for the input vector.

Clause 31: The computer-implemented method of clause 30, further comprising generating a weighting factor using an anomaly detector and the input vector, wherein the anomaly detector determines a degree to which the input vector is anomalous with respect to input vectors in the corpus of training data.

Clause 32: The computer-implemented method of clause 26, wherein determining the distribution of feature space points comprises generating at least one of: a Gaussian mixture model to represent at least a subset of the feature space points, or a clustering model to represent at least a subset of the feature space points.

Clause 33: The computer-implemented method of clause 26, further comprising generating feature data representing a plurality of feature space points using the trained machine learning model and the corpus of training data, wherein determining the distribution of the feature space points comprises determining a distribution of at least a subset of the plurality of feature space points represented by the feature data.

Clause 34: The computer-implemented method of clause 33, wherein generating the feature data representing the plurality of feature space points comprises:

providing a first training data input item of the corpus of training data to an input layer of the trained machine learning model, wherein the trained machine learning model comprises a neural network;

applying a set of weights to the first training data input item, wherein the set of weights is associated with the input layer and a first hidden layer of the neural network; and generating a first feature vector as output of a set of hidden layers comprising the first hidden layer, wherein the first feature vector represents a first feature space point of the plurality of feature space points.

Clause 35: A system comprising:

computer-readable memory storing executable instructions; and one or more processors programmed by the executable instructions to at least:

obtain a trained machine learning model and a corpus of training data used to train the trained machine learning model;

determine, using the trained machine learning model and the corpus of training data, a distribution of feature space points observed during training of the trained machine learning model, wherein data generated from a training input item of the corpus of training data represents a feature space point of the feature space points observed during training of the trained machine learning model, and wherein the feature space point is included in the distribution of feature space points based on the feature space point being associated with one of: an error value having a magnitude that is less than a threshold, a positive error value having a magnitude greater than the threshold, or a negative error value having a magnitude greater than the threshold; and generate augmented regression output based at least partly on output of the trained machine learning model and the distribution of feature space points.

Clause 36: The system of clause 35, wherein to generate the augmented regression output, the one or more processors are programmed by further executable instructions to at least:

generate a regression score based on the trained machine learning model and the input vector; and generate a training-support-based metric representing a degree to which the corpus of training data supports the regression score.

Clause 37: The system of clause 36, wherein to generate the training-support-based metric, the one or more processors are programmed by further executable instructions to determine a support value associated with the distribution of feature space points, wherein the distribution of feature space points is one of a plurality of distributions of feature space points, and wherein each of the plurality of distributions of feature space points is associated with a different support value.

Clause 38: The system of clause 35, wherein the augmented regression output comprises a weighted regression score weighted based on a degree to which the corpus of training data supports an initial regression score.

Clause 39: The system of clause 35, wherein to determine the distribution of feature space points, the one or more processors are programmed by further executable instructions to generate at least one of: a Gaussian mixture model to represent at least a subset of the feature space points, or a clustering model to represent at least a subset of the feature space points.

Clause 40: The system of clause 35, wherein the one or more processors are programmed by further executable instructions to generate feature data representing a plurality of feature space points using the trained machine learning model and the corpus of training data, wherein the distribution of the feature space points comprises a distribution of at least a subset of the plurality of feature space points represented by the feature data.

Terminology

Depending on the embodiment, certain acts, events, or functions of any of the processes or algorithms described herein can be performed in a different sequence, can be added, merged, or left out altogether (e.g., not all described operations, sequencing, or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a computer processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A computer processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

47

What is claimed is:

1. A system comprising:

computer-readable memory storing executable instructions; and one or more processors programmed by the executable instructions to at least:

obtain a corpus of training data comprising a plurality of training data input vectors and a plurality of reference data output vectors, wherein a reference data output vector of the plurality of reference data output vectors represents a desired output generated by an artificial neural network from a corresponding training data input vector of the plurality of training data input vectors;

train the artificial neural network using the corpus of training data to generate classification determinations;

generate, using the artificial neural network and the plurality of training data input vectors:

a plurality of feature vectors, wherein a feature vector of the plurality of feature vectors comprises output values of a hidden layer of the artificial neural network representing a point in a feature space, wherein the feature space is learned during training the artificial neural network to make classification determinations; and a plurality of training data output vectors, wherein a training data output vector of the plurality of training data output vectors represents a classification determination of an output layer of the artificial neural network based on a corresponding feature vector of the plurality of feature vectors;

determine, based on an analysis of the plurality of training data output vectors with respect to the plurality of reference data output vectors:

a first distribution of feature vectors corresponding to training data output vectors representing true positive classification determinations;

a second distribution of feature vectors corresponding to training data output vectors representing true negative classification determinations;

a third distribution of feature vectors corresponding to training data output vectors representing false positive classification determinations;

a fourth distribution of feature vectors corresponding to training data output vectors representing false negative classification determinations; and a fifth distribution of feature vectors corresponding to the plurality of training data output vectors;

wherein at least one of the first distribution of feature vectors, the second distribution of feature vectors, the third distribution of feature vectors, the fourth distribution of feature vectors, or the fifth distribution of feature vectors comprises one of a Gaussian mixture model or a clustering model representing feature vectors corresponding to training data output vectors; and configure the artificial neural network to generate augmented classification output based at least partly on the first distribution of feature vectors, the second distribution of feature vectors, the third distribution of feature vectors, the fourth distribution of feature vectors, and the fifth distribution of feature vectors, wherein augmented classification output comprises an indication of a degree to which an associated portion of the feature space is supported by training of the artificial neural network.

2. The system of claim 1, wherein to generate the plurality of feature vectors, the one or more processors are programmed by the executable instructions to:

receive a first training data input vector of the plurality of training data input vectors at an input layer of the artificial neural network;

apply a set of weights to the first training data input vector, wherein the set of weights is associated with the input layer and a first hidden layer of the artificial neural network; and generate a first feature vector as output of a set of hidden layers of the artificial neural network, the set of hidden layers comprising the first hidden layer.

3. The system of claim 1, wherein to configure the artificial neural network to generate augmented classification output, the one or more processors are programmed by the executable instructions to generate an augmented classification output component configured to generate classification augmentation data based on at least on one of: the first distribution of feature vectors, the second distribution of feature vectors, the third distribution of feature vectors, the fourth distribution of feature vectors, or the fifth distribution of feature vectors.

4. The system of claim 3, wherein the classification augmentation data comprises at least one of: a weighting factor to be applied to a classification score, or a training support metric to be output separately from the classification score.

5. The system of claim 1, wherein the corpus of training data represents one of medical scan data, medical imaging data, or medical diagnostic data.

6. The system of claim 1, wherein the corpus of training data represents one of autonomous vehicle imaging data, routing planning data, or security data.

7. A system comprising:

computer-readable memory storing executable instructions; and one or more processors programmed by the executable instructions to at least:

obtain a corpus of training data comprising a plurality of training data input vectors and a plurality of reference data output vectors, wherein a reference data output vector of the plurality of reference data output vectors represents a desired output generated by an artificial neural network from a corresponding training data input vector of the plurality of training data input vectors;

train the artificial neural network using the corpus of training data to generate regression output;

generate, using the artificial neural network and the plurality of training data input vectors:

a plurality of feature vectors, wherein a feature vector of the plurality of feature vectors comprises output values of a hidden layer of the artificial neural network representing a point in a feature space, wherein the feature space is learned during training the artificial neural network to generate regression output; and a plurality of training data output vectors, wherein a training data output vector of the plurality of training data output vectors represents a regression output of an output layer of the artificial neural network based on a corresponding feature vector;

determine, based on an analysis of the plurality of training data output vectors with respect to the plurality of reference data output vectors:

a first distribution of feature vectors corresponding to training data output vectors in a first subset of the training data output vectors, wherein each training data output vector in the first subset is associated with an error value that is less than a large error threshold;

a second distribution of feature vectors corresponding to training data output vectors in a second subset of the training data output vectors, wherein each training data output vector in the second subset is associated with a positive error value having a magnitude greater than the large error threshold;

a third distribution of feature vectors corresponding to training data output vectors in a third subset of the training data output vectors, wherein each training data output vector in the third subset is associated with a negative error value having a magnitude greater than the large error threshold; and a fourth distribution of the plurality of feature vectors;

wherein at least one of the first distribution of feature vectors, the second distribution of feature vectors, the third distribution of feature vectors, or the fourth distribution of feature vectors comprises one of a Gaussian mixture model or a clustering model representing feature vectors corresponding to training data output vectors; and configure the artificial neural network to generate augmented regression output based at least partly on the first distribution of feature vectors, the second distribution of feature vectors, the third distribution of feature vectors, and the fourth distribution of feature vectors, wherein augmented regression output comprises an indication of a degree to which an associated portion of the feature space is supported by training of the artificial neural network.

8. The system of claim 7, wherein to generate the plurality of feature vectors, the one or more processors are programmed by the executable instructions to:

receive a first training data input vector of the plurality of training data input vectors at an input layer of the artificial neural network;

apply a set of weights to the first training data input vector, wherein the set of weights is associated with the input layer and a first hidden layer of the artificial neural network; and generate a first feature vector as output of a set of hidden layers of the artificial neural network, the set of hidden layers comprising the first hidden layer.

9. The system of claim 7, wherein to configure the artificial neural network to generate augmented regression output, the one or more processors are programmed by the executable instructions to generate an augmented regression output component configured to generate regression augmentation data based on at least on one of: the first distribution of feature vectors, the second distribution of feature vectors, the third distribution of feature vectors, or the fourth distribution of feature vectors.

10. The system of claim 7, wherein the corpus of training data represents one of medical scan data, medical imaging data, or medical diagnostic data.

11. The system of claim 7, wherein the corpus of training data represents one of autonomous vehicle imaging data, routing planning data, or security data.

12. A computer-implemented method comprising:

under control of a computing system comprising one or more processors configured to execute specific instructions, obtaining a corpus of training data comprising a plurality of training data input vectors and a plurality of reference data output vectors, wherein a reference data output vector of the plurality of reference data output vectors represents a desired output generated by an artificial neural network from a corresponding training data input vector of the plurality of training data input vectors;

training the artificial neural network using the corpus of training data to generate classification determinations;

generating, using the artificial neural network and the plurality of training data input vectors:

a plurality of feature vectors, wherein a feature vector of the plurality of feature vectors comprises output values of a hidden layer of the artificial neural network representing a point in a feature space, wherein the feature space is learned during training the artificial neural network to make classification determinations; and a plurality of training data output vectors, wherein a training data output vector of the plurality of training data output vectors represents a classification determination of an output layer of the artificial neural network based on a corresponding feature vector of the plurality of feature vectors;

determining, based on an analysis of the plurality of training data output vectors with respect to the plurality of reference data output vectors:

a first distribution of feature vectors corresponding to training data output vectors representing true positive classification determinations;

a second distribution of feature vectors corresponding to training data output vectors representing true negative classification determinations;

a third distribution of feature vectors corresponding to training data output vectors representing false positive classification determinations;

a fourth distribution of feature vectors corresponding to training data output vectors representing false negative classification determinations; and a fifth distribution of feature vectors corresponding to the plurality of training data output vectors;

wherein at least one of the first distribution of feature vectors, the second distribution of feature vectors, the third distribution of feature vectors, the fourth distribution of feature vectors, or the fifth distribution of feature vectors comprises one of a Gaussian mixture model or a clustering model representing feature vectors corresponding to training data output vectors; and configuring the artificial neural network to generate augmented classification output based at least partly on the first distribution of feature vectors, the second distribution of feature vectors, the third distribution of feature vectors, the fourth distribution of feature vectors, and the fifth distribution of feature vectors, wherein augmented classification output comprises an indication of a degree to which an associated portion of the feature space is supported by training of the artificial neural network.

13. The computer-implemented method of claim 12, wherein generating the plurality of feature vectors comprises:

receiving a first training data input vector of the plurality of training data input vectors at an input layer of the artificial neural network;

applying a set of weights to the first training data input vector, wherein the set of weights is associated with the input layer and a first hidden layer of the artificial neural network; and generating a first feature vector as output of a set of hidden layers of the artificial neural network, the set of hidden layers comprising the first hidden layer.

14. The computer-implemented method of claim 12, wherein configuring the artificial neural network to generate augmented classification output comprises generating an augmented classification output component configured to generate classification augmentation data based on at least on one of: the first distribution of feature vectors, the second distribution of feature vectors, the third distribution of feature vectors, the fourth distribution of feature vectors, or the fifth distribution of feature vectors.

15. The computer-implemented method of claim 14, wherein the classification augmentation data comprises at least one of: a weighting factor to be applied to a classification score, or a training support metric to be output separately from the classification score.

16. The computer-implemented method of claim 12, wherein the corpus of training data represents one of medical scan data, medical imaging data, or medical diagnostic data.

17. The computer-implemented method of claim 12, wherein the corpus of training data represents one of autonomous vehicle imaging data, routing planning data, or security data.

18. A computer-implemented method comprising:

under control of a computing system comprising one or more processors configured to execute specific instructions, obtaining a corpus of training data comprising a plurality of training data input vectors and a plurality of reference data output vectors, wherein a reference data output vector of the plurality of reference data output vectors represents a desired output generated by an artificial neural network from a corresponding training data input vector of the plurality of training data input vectors;

training the artificial neural network using the corpus of training data to generate regression output;

generating, using the artificial neural network and the plurality of training data input vectors:

a plurality of feature vectors, wherein a feature vector of the plurality of feature vectors comprises output values of a hidden layer of the artificial neural network representing a point in a feature space, wherein the feature space is learned during training the artificial neural network to generate regression output; and a plurality of training data output vectors, wherein a training data output vector of the plurality of training data output vectors represents a regression output of an output layer of the artificial neural network based on a corresponding feature vector;

determining, based on an analysis of the plurality of training data output vectors with respect to the plurality of reference data output vectors:

a first distribution of feature vectors corresponding to training data output vectors in a first subset of the training data output vectors, wherein each training data output vector in the first subset is associated with an error value that is less than a large error threshold;

a second distribution of feature vectors corresponding to training data output vectors in a second subset of the training data output vectors, wherein each training data output vector in the second subset is associated with a positive error value having a magnitude greater than the large error threshold;

a third distribution of feature vectors corresponding to training data output vectors in a third subset of the training data output vectors, wherein each training data output vector in the third subset is associated with a negative error value having a magnitude greater than the large error threshold; and a fourth distribution of the plurality of feature vectors;

wherein at least one of the first distribution of feature vectors, the second distribution of feature vectors, the third distribution of feature vectors, or the fourth distribution of feature vectors comprises one of a Gaussian mixture model or a clustering model representing feature vectors corresponding to training data output vectors; and configuring the artificial neural network to generate augmented regression output based at least partly on the first distribution of feature vectors, the second distribution of feature vectors, the third distribution of feature vectors, and the fourth distribution of feature vectors, wherein augmented regression output comprises an indication of a degree to which an associated portion of the feature space is supported by training of the artificial neural network.

19. The computer-implemented method of claim 18, wherein generating the plurality of feature vectors comprises:

receiving a first training data input vector of the plurality of training data input vectors at an input layer of the artificial neural network;

applying a set of weights to the first training data input vector, wherein the set of weights is associated with the input layer and a first hidden layer of the artificial neural network; and generating a first feature vector as output of a set of hidden layers of the artificial neural network, the set of hidden layers comprising the first hidden layer.

20. The computer-implemented method of claim 18, wherein configuring the artificial neural network to generate augmented regression output comprises generating an augmented regression output component configured to generate regression augmentation data based on at least on one of: the first distribution of feature vectors, the second distribution of feature vectors, the third distribution of feature vectors, or the fourth distribution of feature vectors.

21. The computer-implemented method of claim 18, wherein the corpus of training data represents one of medical scan data, medical imaging data, or medical diagnostic data.

22. The computer-implemented method of claim 18, wherein the corpus of training data represents one of autonomous vehicle imaging data, routing planning data, or security data.

* * * * *